(12) United States Patent
Mehrotra

(10) Patent No.: US 8,265,140 B2
(45) Date of Patent: Sep. 11, 2012

(54) FINE-GRAINED CLIENT-SIDE CONTROL OF SCALABLE MEDIA DELIVERY

(75) Inventor: Sanjeev Mehrotra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 12/242,524

(22) Filed: Sep. 30, 2008

(65) Prior Publication Data

US 2010/0080290 A1   Apr. 1, 2010

(51) Int. Cl.
*H04N 7/12* (2006.01)
*G06K 9/36* (2006.01)

(52) U.S. Cl. ........... 375/240.02; 375/240.2; 375/240.21; 375/240.22; 375/240.23; 375/240.24; 382/236; 382/237; 382/238

(58) Field of Classification Search .............. 375/240.02
See application file for complete search history.

(56) References Cited

U.S. PATENT DOCUMENTS

| | | | |
|---|---|---|---|
| 4,051,470 A | 9/1977 | Esteban et al. |
| 4,454,546 A | 6/1984 | Mori |
| 4,493,091 A | 1/1985 | Gundry |
| 4,706,260 A | 11/1987 | Fedele et al. |
| 4,802,224 A | 1/1989 | Shiraki et al. |
| 4,954,892 A | 9/1990 | Asai et al. |
| 5,043,919 A | 8/1991 | Callaway et al. |
| 5,089,889 A | 2/1992 | Sugiyama |
| 5,136,377 A | 8/1992 | Johnston et al. |
| 5,235,618 A | 8/1993 | Sakai et al. |
| 5,262,964 A | 11/1993 | Bonsall et al. |
| 5,266,941 A | 11/1993 | Akeley et al. |
| 5,317,672 A | 5/1994 | Crossman et al. |
| 5,394,170 A | 2/1995 | Akeley et al. |
| 5,398,069 A | 3/1995 | Huang et al. |
| 5,400,371 A | 3/1995 | Natarajan |
| 5,414,796 A | 5/1995 | Jacobs et al. |
| 5,448,297 A | 9/1995 | Alattar et al. |

(Continued)

FOREIGN PATENT DOCUMENTS

JP   2008-523687   7/2008

(Continued)

OTHER PUBLICATIONS

Agarwal et al., "Optimal Buffering Policy for Downloading Music in Heterogeneous Wireless Networks," *Wireless Communications and Networking Conference*, vol. 1, pp. 337-341 (Mar. 17-21, 2002).

(Continued)

*Primary Examiner* — Longbit Chai
(74) *Attorney, Agent, or Firm* — Klarquist Sparkman, LLP

(57) ABSTRACT

Techniques and tools for adjusting quality and bit rate of multiple chunks of media delivered over a network are described. For example, each of the multiple chunks is encoded as multiple layers (e.g., a base layer and multiple embedded residual layers) for fine-grained scalability at different rate/quality points. A server stores the encoded data for the layers of chunks as well as curve information that parameterizes rate-distortion curves for the chunks. The server sends the curve information to a client. For the multiple chunks, the client uses the curve information to determine rate-distortion preferences for the respective chunks, then sends feedback indicating the rate-distortion preferences to the server. For each of the multiple chunks, the server, based at least in part upon the feedback, selects one or more scalable layers of the chunk to deliver to the client.

25 Claims, 6 Drawing Sheets

U.S. PATENT DOCUMENTS

| | | |
|---|---|---|
| 5,457,495 A | 10/1995 | Hartung |
| 5,467,134 A | 11/1995 | Laney et al. |
| 5,533,052 A | 7/1996 | Bhaskar |
| 5,570,363 A | 10/1996 | Holm |
| 5,579,430 A | 11/1996 | Grill et al. |
| 5,586,200 A | 12/1996 | Devaney et al. |
| 5,602,959 A | 2/1997 | Bergstrom et al. |
| 5,623,424 A | 4/1997 | Azadegan et al. |
| 5,627,938 A | 5/1997 | Johnston |
| 5,650,860 A | 7/1997 | Uz |
| 5,654,760 A | 8/1997 | Ohtsuki |
| 5,661,755 A | 8/1997 | Van De Kerkhof et al. |
| 5,666,161 A | 9/1997 | Kohiyama et al. |
| 5,686,964 A | 11/1997 | Tabatabai et al. |
| 5,724,453 A | 3/1998 | Ratnakar et al. |
| 5,742,735 A | 4/1998 | Eberlein et al. |
| 5,754,974 A | 5/1998 | Griffin et al. |
| 5,787,203 A | 7/1998 | Lee et al. |
| 5,802,213 A | 9/1998 | Gardos |
| 5,819,215 A | 10/1998 | Dobson et al. |
| 5,825,310 A | 10/1998 | Tsutsui |
| 5,835,149 A | 11/1998 | Astle |
| 5,835,495 A | 11/1998 | Ferriere |
| 5,845,243 A | 12/1998 | Smart et al. |
| 5,867,230 A | 2/1999 | Wang et al. |
| 5,884,039 A | 3/1999 | Ludwig et al. |
| 5,886,276 A | 3/1999 | Levine et al. |
| 5,903,892 A | 5/1999 | Hoffert et al. |
| 5,917,830 A | 6/1999 | Chen et al. |
| 5,926,226 A | 7/1999 | Proctor et al. |
| 5,933,451 A | 8/1999 | Ozkan et al. |
| 5,952,943 A | 9/1999 | Walsh et al. |
| 5,982,305 A | 11/1999 | Taylor |
| 5,986,712 A | 11/1999 | Peterson et al. |
| 5,987,376 A | 11/1999 | Olson et al. |
| 5,990,945 A | 11/1999 | Sinha et al. |
| 5,995,151 A | 11/1999 | Naveen et al. |
| 6,000,053 A | 12/1999 | Levine et al. |
| 6,002,439 A | 12/1999 | Murakami et al. |
| 6,006,241 A | 12/1999 | Purnaveja et al. |
| 6,014,706 A | 1/2000 | Cannon et al. |
| 6,029,126 A | 2/2000 | Malvar |
| 6,041,345 A | 3/2000 | Levi et al. |
| 6,049,630 A | 4/2000 | Wang et al. |
| 6,058,362 A | 5/2000 | Malvar |
| 6,072,831 A | 6/2000 | Chen |
| 6,073,153 A | 6/2000 | Malvar |
| 6,075,768 A | 6/2000 | Mishra |
| 6,081,554 A | 6/2000 | Lee et al. |
| 6,088,392 A | 7/2000 | Rosenberg |
| 6,108,382 A | 8/2000 | Gringeri et al. |
| 6,111,914 A | 8/2000 | Bist |
| 6,115,689 A | 9/2000 | Malvar |
| 6,141,053 A | 10/2000 | Saukkonen |
| 6,160,846 A | 12/2000 | Chiang et al. |
| 6,167,162 A | 12/2000 | Jacquin et al. |
| 6,182,034 B1 | 1/2001 | Malvar |
| 6,192,075 B1 | 2/2001 | Jeng |
| 6,212,232 B1 | 4/2001 | Reed et al. |
| 6,215,820 B1 | 4/2001 | Bagni et al. |
| 6,223,162 B1 | 4/2001 | Chen et al. |
| 6,226,407 B1 | 5/2001 | Zabih et al. |
| 6,240,380 B1 | 5/2001 | Malvar |
| 6,243,497 B1 | 6/2001 | Chiang et al. |
| 6,259,739 B1 | 7/2001 | Kondo |
| 6,278,735 B1 | 8/2001 | Mohsenian |
| 6,311,209 B1 | 10/2001 | Olson et al. |
| 6,320,825 B1 | 11/2001 | Bruekers et al. |
| 6,339,794 B2 | 1/2002 | Bolosky et al. |
| 6,351,226 B1 | 2/2002 | Saunders et al. |
| 6,370,502 B1 | 4/2002 | Wu et al. |
| 6,421,738 B1 | 7/2002 | Ratan et al. |
| 6,421,739 B1 | 7/2002 | Holiday |
| 6,433,795 B1 | 8/2002 | MacNaughton et al. |
| 6,441,754 B1 | 8/2002 | Wang et al. |
| 6,466,987 B2 | 10/2002 | Bolosky et al. |
| 6,473,409 B1 | 10/2002 | Malvar |
| 6,490,554 B2 | 12/2002 | Endo et al. |
| 6,493,388 B1 | 12/2002 | Wang |
| 6,501,797 B1 | 12/2002 | van der Schaar et al. |
| 6,501,798 B1 | 12/2002 | Sivan |
| 6,522,693 B1 | 2/2003 | Lu et al. |
| 6,539,124 B2 | 3/2003 | Sethuraman et al. |
| 6,560,636 B2 | 5/2003 | Cohen et al. |
| 6,573,915 B1 | 6/2003 | Sivan et al. |
| 6,574,593 B1 | 6/2003 | Gao et al. |
| 6,625,321 B1 | 9/2003 | Li et al. |
| 6,628,712 B1 | 9/2003 | Le Maguet |
| 6,646,195 B1 | 11/2003 | Puryear |
| 6,654,417 B1 | 11/2003 | Hui |
| 6,654,419 B1 | 11/2003 | Sriram et al. |
| 6,654,790 B2 | 11/2003 | Ogle et al. |
| 6,675,199 B1 | 1/2004 | Mohammed et al. |
| 6,697,072 B2 | 2/2004 | Russell et al. |
| 6,704,813 B2 | 3/2004 | Smirnov et al. |
| 6,728,317 B1 | 4/2004 | Demos |
| 6,732,071 B2 | 5/2004 | Lopez-Estrada et al. |
| 6,745,364 B2 | 6/2004 | Bhatt et al. |
| 6,754,715 B1 | 6/2004 | Cannon et al. |
| 6,760,482 B1 * | 7/2004 | Taubman ..................... 382/240 |
| 6,760,598 B1 | 7/2004 | Kurjenniemi |
| 6,763,374 B1 | 7/2004 | Levi et al. |
| 6,789,123 B2 | 9/2004 | Li et al. |
| 6,792,449 B2 | 9/2004 | Colville et al. |
| 6,801,947 B1 | 10/2004 | Li |
| 6,810,083 B2 | 10/2004 | Chen et al. |
| 6,836,791 B1 | 12/2004 | Levi et al. |
| 6,876,703 B2 | 4/2005 | Ismaeil et al. |
| 6,885,471 B1 | 4/2005 | Minowa et al. |
| 6,895,050 B2 | 5/2005 | Lee |
| 6,934,677 B2 | 8/2005 | Chen et al. |
| 6,937,770 B1 | 8/2005 | Oguz et al. |
| 6,961,631 B1 | 11/2005 | Puryear |
| 6,968,364 B1 | 11/2005 | Wong et al. |
| 6,974,901 B2 | 12/2005 | Puryear |
| 6,980,695 B2 | 12/2005 | Mehrotra |
| 7,016,409 B2 | 3/2006 | Unger |
| 7,023,915 B2 | 4/2006 | Pian et al. |
| 7,027,982 B2 | 4/2006 | Chen et al. |
| 7,031,700 B1 | 4/2006 | Weaver et al. |
| 7,046,805 B2 | 5/2006 | Fitzhardinge et al. |
| 7,054,365 B2 | 5/2006 | Kim et al. |
| 7,054,774 B2 | 5/2006 | Batterberry et al. |
| 7,072,973 B1 | 7/2006 | Newson et al. |
| 7,107,606 B2 | 9/2006 | Lee |
| 7,111,044 B2 | 9/2006 | Lee |
| 7,124,164 B1 | 10/2006 | Chemtob |
| 7,143,030 B2 | 11/2006 | Chen et al. |
| 7,146,313 B2 | 12/2006 | Chen et al. |
| 7,149,247 B2 | 12/2006 | Sullivan |
| 7,151,749 B2 | 12/2006 | Vega-Garcia et al. |
| 7,162,533 B2 | 1/2007 | Klemets |
| 7,174,384 B2 | 2/2007 | Cheung |
| 7,174,385 B2 | 2/2007 | Li |
| 7,176,957 B2 | 2/2007 | Ivashin et al. |
| 7,177,642 B2 | 2/2007 | Sanchez Herrero et al. |
| 7,184,959 B2 | 2/2007 | Gibbon |
| 7,190,670 B2 | 3/2007 | Varsa et al. |
| 7,206,822 B2 | 4/2007 | Levi et al. |
| 7,206,854 B2 | 4/2007 | Kauffman et al. |
| 7,248,740 B2 | 7/2007 | Sullivan |
| 7,260,525 B2 | 8/2007 | Chen et al. |
| 7,263,482 B2 | 8/2007 | Chen et al. |
| 7,266,613 B1 | 9/2007 | Brown et al. |
| 7,283,881 B2 | 10/2007 | Puryear |
| 7,283,966 B2 | 10/2007 | Zhang et al. |
| 7,286,748 B2 | 10/2007 | Srinivasan et al. |
| 7,296,063 B2 | 11/2007 | Levi et al. |
| 7,302,490 B1 | 11/2007 | Gupta et al. |
| 7,313,236 B2 | 12/2007 | Amini et al. |
| 7,313,755 B2 | 12/2007 | Rahman et al. |
| 7,342,924 B2 | 3/2008 | Levi et al. |
| 7,343,291 B2 | 3/2008 | Thumpudi et al. |
| 7,346,007 B2 | 3/2008 | Curcio et al. |
| 7,348,483 B2 | 3/2008 | Puryear |
| 7,359,955 B2 | 4/2008 | Menon et al. |
| 7,360,230 B1 | 4/2008 | Paz et al. |

| | | | | | | |
|---|---|---|---|---|---|---|
| 7,365,752 | B2 | 4/2008 | Xie | 2003/0220972 A1 | 11/2003 | Montet et al. |
| 7,383,180 | B2 | 6/2008 | Thumpudi et al. | 2003/0236905 A1 | 12/2003 | Choi et al. |
| 7,391,717 | B2 | 6/2008 | Klemets et al. | 2003/0236906 A1 | 12/2003 | Klemets et al. |
| 7,392,316 | B2 | 6/2008 | Klemets et al. | 2004/0098748 A1 | 5/2004 | Bo et al. |
| 7,401,221 | B2 | 7/2008 | Adent et al. | 2004/0117427 A1 | 6/2004 | Allen et al. |
| 7,409,145 | B2 | 8/2008 | Antoun et al. | 2004/0131340 A1 | 7/2004 | Antoun et al. |
| 7,424,730 | B2 | 9/2008 | Chou | 2004/0172478 A1 | 9/2004 | Jacobs |
| 7,433,746 | B2 | 10/2008 | Puryear | 2004/0268397 A1 | 12/2004 | Dunbar et al. |
| 7,444,419 | B2 | 10/2008 | Green | 2005/0002453 A1 | 1/2005 | Chang et al. |
| 7,451,229 | B2 | 11/2008 | Klemets et al. | 2005/0009520 A1 | 1/2005 | Herrero et al. |
| 7,466,721 | B2 | 12/2008 | Levi et al. | 2005/0015259 A1 | 1/2005 | Thumpudi et al. |
| 7,472,198 | B2 | 12/2008 | Gupta et al. | 2005/0015528 A1 | 1/2005 | Du |
| 7,480,382 | B2 | 1/2009 | Dunbar et al. | 2005/0016363 A1 | 1/2005 | Puryear |
| 7,483,532 | B2 | 1/2009 | Alkove et al. | 2005/0024487 A1 | 2/2005 | Chen |
| 7,492,769 | B2 | 2/2009 | Klemets | 2005/0047503 A1 | 3/2005 | Han et al. |
| 7,493,644 | B1 | 2/2009 | Tanskanen | 2005/0050152 A1 | 3/2005 | Penner et al. |
| 7,505,485 | B2 | 3/2009 | Sullivan et al. | 2005/0066063 A1 | 3/2005 | Grigorovitch |
| 7,528,314 | B2 | 5/2009 | Puryear | 2005/0076039 A1 | 4/2005 | Ludwig et al. |
| 7,529,541 | B2 | 5/2009 | Cho et al. | 2005/0076136 A1 | 4/2005 | Cho |
| 7,536,469 | B2 | 5/2009 | Chou et al. | 2005/0084015 A1 | 4/2005 | Han et al. |
| 7,538,267 | B2 | 5/2009 | Puryear | 2005/0084166 A1 | 4/2005 | Boneh et al. |
| 7,552,227 | B2 | 6/2009 | Wang | 2005/0105815 A1 | 5/2005 | Zhang et al. |
| 7,554,922 | B2 | 6/2009 | Vega-Garcia et al. | 2005/0117641 A1 | 6/2005 | Xu et al. |
| 7,555,464 | B2 | 6/2009 | Candelore | 2005/0123058 A1 | 6/2005 | Greenbaum |
| 7,558,472 | B2 | 7/2009 | Locket et al. | 2005/0135484 A1 | 6/2005 | Lee |
| 7,565,429 | B1 | 7/2009 | Fernandez | 2005/0157784 A1 | 7/2005 | Tanizawa et al. |
| 7,581,255 | B2 | 8/2009 | Alkove et al. | 2005/0204385 A1 | 9/2005 | Sull et al. |
| 7,603,387 | B2 | 10/2009 | Gates et al. | 2005/0207734 A1 | 9/2005 | Howell |
| 7,631,015 | B2 | 12/2009 | Gupta et al. | 2005/0234731 A1 | 10/2005 | Sirivara et al. |
| 7,631,039 | B2 | 12/2009 | Eisenberg | 2005/0234858 A1 | 10/2005 | Torii et al. |
| 7,633,005 | B2 | 12/2009 | Puryear | 2005/0246384 A1 | 11/2005 | Foehr et al. |
| 7,644,172 | B2 | 1/2010 | Stewart et al. | 2005/0254508 A1 | 11/2005 | Aksu et al. |
| 7,663,049 | B2 | 2/2010 | Puryear | 2005/0267994 A1 | 12/2005 | Wong et al. |
| 7,667,121 | B2 | 2/2010 | Puryear | 2006/0015637 A1 | 1/2006 | Chung |
| 7,672,743 | B2 | 3/2010 | Messer et al. | 2006/0026294 A1 | 2/2006 | Virdi |
| 7,673,306 | B2 | 3/2010 | Puryear | 2006/0029065 A1 | 2/2006 | Fellman |
| 7,673,315 | B1 | 3/2010 | Wong et al. | 2006/0047779 A1 | 3/2006 | Deshpande |
| 7,676,495 | B2 | 3/2010 | Qian | 2006/0062302 A1 | 3/2006 | Yin et al. |
| 7,684,566 | B2 | 3/2010 | Oliveira et al. | 2006/0088094 A1 | 4/2006 | Cieplinski |
| 7,720,908 | B1 | 5/2010 | Newson et al. | 2006/0126713 A1 | 6/2006 | Chou et al. |
| 7,725,557 | B2 | 5/2010 | Klemets et al. | 2006/0136597 A1 | 6/2006 | Shabtai et al. |
| 7,761,609 | B1 | 7/2010 | Srinivasan et al. | 2006/0156363 A1 | 7/2006 | Wu et al. |
| 7,769,880 | B2 | 8/2010 | Paka et al. | 2006/0165166 A1 | 7/2006 | Chou |
| 7,783,772 | B2 | 8/2010 | Klemets | 2006/0184697 A1 | 8/2006 | Virdi |
| 7,783,773 | B2 | 8/2010 | Wu et al. | 2006/0218264 A1 | 9/2006 | Ogawa et al. |
| 7,809,851 | B2 | 10/2010 | Klemets | 2006/0235883 A1 | 10/2006 | Krebs et al. |
| 7,839,895 | B2 | 11/2010 | Sullivan et al. | 2006/0242080 A1 | 10/2006 | Van Dyke et al. |
| 7,860,996 | B2 | 12/2010 | Musayev et al. | 2006/0242315 A1 | 10/2006 | Nichols |
| 7,873,040 | B2 | 1/2011 | Karlsgodt | 2006/0248570 A1 | 11/2006 | Witwer |
| 2002/0073084 | A1 | 6/2002 | Kauffman et al. | 2006/0270404 A1 | 11/2006 | Tuohino et al. |
| 2002/0087634 | A1 | 7/2002 | Ogle et al. | 2006/0282540 A1 | 12/2006 | Tanimoto |
| 2002/0095332 | A1 | 7/2002 | Doherty et al. | 2006/0282566 A1 | 12/2006 | Virdi et al. |
| 2002/0118809 | A1 | 8/2002 | Eisenberg | 2006/0288099 A1 | 12/2006 | Jefferson et al. |
| 2002/0122491 | A1 | 9/2002 | Karczewicz et al. | 2007/0006064 A1 | 1/2007 | Colle |
| 2002/0133547 | A1 | 9/2002 | Lin | 2007/0037599 A1 | 2/2007 | Tillet et al. |
| 2002/0136406 | A1 | 9/2002 | Fitzhardinge et al. | 2007/0038873 A1 | 2/2007 | Oliveira et al. |
| 2002/0138619 | A1 | 9/2002 | Ramaley et al. | 2007/0058926 A1 | 3/2007 | Virdi |
| 2002/0143556 | A1 | 10/2002 | Kadatch | 2007/0078768 A1 | 4/2007 | Dawson |
| 2002/0146102 | A1 | 10/2002 | Lang | 2007/0081586 A1* | 4/2007 | Raveendran et al. ...... 375/240.1 |
| 2002/0154693 | A1 | 10/2002 | Demos | 2007/0083886 A1 | 4/2007 | Kauffman et al. |
| 2002/0176624 | A1 | 11/2002 | Kostrzewski et al. | 2007/0097816 A1 | 5/2007 | Van Gassel |
| 2002/0178138 | A1 | 11/2002 | Ender et al. | 2007/0100891 A1 | 5/2007 | Nee |
| 2002/0184391 | A1 | 12/2002 | Phillips | 2007/0192789 A1 | 8/2007 | Medford |
| 2002/0194608 | A1 | 12/2002 | Goldhor | 2007/0204321 A1 | 8/2007 | Shen et al. |
| 2003/0007464 | A1 | 1/2003 | Balani | 2007/0274383 A1 | 11/2007 | Yu et al. |
| 2003/0037103 | A1 | 2/2003 | Salmi et al. | 2007/0276954 A1 | 11/2007 | Chan et al. |
| 2003/0055995 | A1 | 3/2003 | Ala-Honkola | 2008/0022005 A1 | 1/2008 | Wu et al. |
| 2003/0061607 | A1 | 3/2003 | Hunter et al. | 2008/0037954 A1 | 2/2008 | Lee |
| 2003/0072370 | A1 | 4/2003 | Girod et al. | 2008/0046939 A1 | 2/2008 | Lu et al. |
| 2003/0078972 | A1 | 4/2003 | Tapissier et al. | 2008/0060029 A1 | 3/2008 | Park et al. |
| 2003/0093530 | A1 | 5/2003 | Syed | 2008/0086570 A1 | 4/2008 | Dey et al. |
| 2003/0110236 | A1 | 6/2003 | Yang et al. | 2008/0091838 A1 | 4/2008 | Miceli |
| 2003/0115041 | A1 | 6/2003 | Chen | 2008/0172441 A1 | 7/2008 | Speicher |
| 2003/0115042 | A1 | 6/2003 | Chen | 2008/0195743 A1 | 8/2008 | Brueck et al. |
| 2003/0115050 | A1 | 6/2003 | Chen | 2008/0195744 A1 | 8/2008 | Bowra |
| 2003/0115051 | A1 | 6/2003 | Chen | 2008/0195761 A1 | 8/2008 | Jabri et al. |
| 2003/0115052 | A1 | 6/2003 | Chen | 2008/0201386 A1 | 8/2008 | Maharajh et al. |
| 2003/0125932 | A1 | 7/2003 | Wang et al. | 2008/0211901 A1 | 9/2008 | Civanlar et al. |
| 2003/0172131 | A1 | 9/2003 | Ao | 2008/0256085 A1 | 10/2008 | Lee et al. |

| | | | |
|---|---|---|---|
| 2008/0312923 | A1 | 12/2008 | Crinon et al. |
| 2009/0006538 | A1 | 1/2009 | Risney et al. |
| 2009/0007171 | A1 | 1/2009 | Casey et al. |
| 2009/0043657 | A1 | 2/2009 | Swift et al. |
| 2009/0043906 | A1 | 2/2009 | Hurst et al. |
| 2009/0049186 | A1 | 2/2009 | Agnihotri et al. |
| 2009/0055417 | A1 | 2/2009 | Hannuksela |
| 2009/0076904 | A1 | 3/2009 | Serena |
| 2009/0089401 | A1 | 4/2009 | Zhang et al. |
| 2009/0132356 | A1 | 5/2009 | Booth et al. |
| 2009/0132599 | A1 | 5/2009 | Soroushian et al. |
| 2009/0132721 | A1 | 5/2009 | Soroushian et al. |
| 2009/0199236 | A1 | 8/2009 | Barrett et al. |
| 2009/0254672 | A1 | 10/2009 | Zhang |
| 2009/0279605 | A1 | 11/2009 | Holcomb et al. |
| 2009/0282162 | A1 | 11/2009 | Mehrotra et al. |
| 2009/0282475 | A1 | 11/2009 | George et al. |
| 2009/0297123 | A1 | 12/2009 | Virdi et al. |
| 2009/0300145 | A1 | 12/2009 | Musayev et al. |
| 2009/0300203 | A1 | 12/2009 | Virdi et al. |
| 2009/0300204 | A1 | 12/2009 | Zhang et al. |
| 2009/0319681 | A1 | 12/2009 | Freelander et al. |
| 2009/0328124 | A1 | 12/2009 | Khouzam et al. |
| 2010/0011119 | A1 | 1/2010 | Knowlton et al. |
| 2010/0058061 | A1 | 3/2010 | Folta et al. |
| 2010/0080290 | A1 | 4/2010 | Mehrotra |
| 2010/0114921 | A1 | 5/2010 | Bocharov et al. |
| 2010/0135636 | A1 | 6/2010 | Zhang et al. |
| 2010/0153988 | A1 | 6/2010 | Takai et al. |
| 2010/0158101 | A1 | 6/2010 | Wu et al. |
| 2010/0180011 | A1 | 7/2010 | Sood et al. |
| 2010/0189183 | A1 | 7/2010 | Gu et al. |
| 2010/0191974 | A1 | 7/2010 | Dubhashi et al. |
| 2010/0235472 | A1 | 9/2010 | Sood et al. |
| 2010/0235528 | A1 | 9/2010 | Bocharov et al. |

FOREIGN PATENT DOCUMENTS

| | | |
|---|---|---|
| WO | 2007-058515 | 5/2007 |

OTHER PUBLICATIONS

Barker et al., "Dynamic Programming Based Smoothing of VBR Video Traffic," 10 pp. (document marked Mar. 6, 2002).
Caetano et al., "Rate Control Strategy for Embedded Wavelet Video Coders," *Electronic Letters*, pp. 1815-1817 (Oct. 14, 1999).
Chang et al., "BubbleUp: Low Latency Fast-Scan for Media Servers," *Fifth ACM International Conference on Multimedia 1997*, 12 pp. (Nov. 1997).
Chavez et al., "Monitoring-Based Adaptive Overlay Streaming Media," printed from http://www.eecs.berkeley.edu/Programs/ugrad/superb/papers2003/Brian%20Chavez.pdf on Aug. 12, 2008.
Cheung et al., "A Comparison of Scalar Quantization Strategies for Noisy Data Channel Data Transmission," *IEEE Transactions on Communications*, vol. 43, No. 2/3/4, pp. 738-742 (Apr. 1995).
Crisafulli et al., "Adaptive Quantization: Solution via Nonadaptive Linear Control," *IEEE Transactions on Communications*, vol. 41, pp. 741-748 (May 1993).
Dai, "Rate-Distortion Analysis and Traffic Modeling of Scalable Video Coders," Dissertation, Texas A&M University, 172 pp. (Dec. 2004).
Dalgic et al., "Characterization of Quality and Traffic for Various Video Encoding Schemes and Various Encoder Control Schemes," Technical Report No. CSL-TR-96-701 (Aug. 1996).
Dolby Laboratories, "AAC Technology," 4 pp. [Downloaded from the web site aac-audio.com on World Wide Web on Nov. 21, 2001].
Fraunhofer-Gesellschaft, "MPEG Audio Layer-3," 4 pp. [Downloaded from the World Wide Web on Oct. 24, 2001].
Fraunhofer-Gesellschaft, "MPEG-2 AAC," 3 pp. [Downloaded from the World Wide Web on Oct. 24, 2001].
Gill et al., "Creating High-Quality Content with Microsoft Windows Media Encoder 7," 4 pp. (2000). [Downloaded from the World Wide Web on May 1, 2002.].
Girod et al., "Advances in channel-adaptive video streaming," *Wireless Communications and Mobile Computing*, 24 pp. (Sep. 2002).
Guo et al., "Practical Wyner-Ziv Switching Scheme for Multiple Bit-Rate Video Streaming," *IEEE*, pp. 249-252 (Sep. 2006).
Guo et al., "P2Cast: Peer-to-peer Patching Scheme for VoD Service," *Proc. of the 12th International Conf. on World Wide Web*, pp. 301-309 (2003).
He et al., "A Unified Rate-Distortion Analysis Framework for Transform Coding," *IEEE Transactions on Circuits and Systems for Video Technology*, vol. 11, No. 12, pp. 1221-1236 (Dec. 2001).
Hsu et al., "Joint Selection of Source and Channel Rate for VBR Video Transmission Under ATM Policing Constraints," *IEEE Journal on Selected Areas in Communications*, vol. 15, No. 6, pp. 1016-1028 (Aug. 1997).
Hsu et al., "Rate Control for Robust Video Transmission over Burst-Error Wireless Channels," *IEEE Journal on Selected Areas of Communication*, vol. 17, No. 5, pp. 756-773 (May 1999).
Huang et al., "Adaptive Live Video Streaming by Priority Drop," *Proc. of the IEEE Conf. on Advanced Video and Signal Based Surveillance*, pp. 342-347 (Jul. 21-22, 2003).
Huang et al., "Optimal Coding Rate Control of Scalable and Multi Bit Rate Streaming Media," Microsoft Research Technical Report, MSR-TR-2005-47, 26 pp. (Apr. 2005).
Huang et al., "Optimal Control of Multiple Bit Rates for Streaming Media," *Proc. Picture Coding Symposium*, 4 pp. (Dec. 2004).
International Search Report and Written Opinion dated Mar. 22, 2010, from Application No. PCT/US2009/054081, 9 pp.
Jafarkhani et al., "Entropy-Constrained Successively Refinable Scalar Quantization," *IEEE Data Compression Conference*, pp. 337-346 (Mar. 1997).
Jayant et al., *Digital Coding of Waveforms, Principles and Applications to Speech and Video*, Prentice Hall, pp. 428-445 (Mar. 1984).
Jenkac et al., "On Video Streaming over Variable Bit-rate and Wireless Channels," presented at Packet Video 2003, Nantes, France, Apr. 28-29, 2003, 11 pp.
Johansen, "Rate-Distortion Optimization for Video Communication in Resource Constrained IP Networks," Thesis, Norwegian University of Science and Technology, 161 pp. (Dec. 2007).
Kalman et al., "Rate-Distortion Optimized Video Streaming with Adaptive Playout," *Proc. Int'l Conf. on Image Processing*, 4 pp. (Jun. 2002).
Kammin et al., "Video multiplexing for the MPEG-2 VBR encoder using a deterministic method," *Second Int'l Conf. on Automated Production of Cross Media Content for Multi-Channel Distribution*, 8 pp. (Dec. 2006).
Li et al., "Optimal Linear Interpolation Coding for Server-Based Computing," *Proc. IEEE Int'l Conf. on Communications*, 5 pp. (Apr. 2002).
Microsoft TechNet, "Streaming Media Services Role," 3 pp. (Jan. 2008).
Mook, "Next-Gen Windows Media Player Leaks to the Web," *BetaNews*, 17 pp. (Jul. 19, 2002) [Downloaded from the World Wide Web on Aug. 8, 2003].
Naveen et al., "Subband Finite State Scalar Quantization," *IEEE Transactions on Image Processing*, vol. 5, No. 1, pp. 150-155 (Jan. 1996).
Ortega et al., "Adaptive Scalar Quantization Without Side Information," *IEEE Transactions on Image Processing*, vol. 6, No. 5, pp. 665-676 (May 1997).
Ortega, "Optimal bit allocation under multiple rate constraints," *Proc. of the Data Compression Conf.*, 10 pp. (Apr. 1996).
Ortega et al., "Optimal Buffer-Constrained Source Quantization and Fast Approximations," *IEEE*, pp. 192-195 (May 1992).
Ortega et al., "Optimal Trellis-based Buffered Compression and Fast Approximation," *IEEE Transactions on Image Processing*, vol. 3, No. 1, pp. 26-40 (Jan. 1994).
Pao, "Encoding Stored Video for Streaming Applications," *IEEE Transactions on Circuits and Systems for Video Technology*, vol. 11, No. 2, pp. 199-209 (Feb. 2001).
Qazzaz et al., "Providing Interactive Video on Demand Services in Distributed Architecture," *29th Proc. of the Euromicro Conf.*, pp. 215-222 (Sep. 1-6, 2003).
Ramchandran et al., "Bit Allocation for Dependent Quantization with Applications to MPEG Video Coders," *IEEE*, pp. v-381-v-384 (Apr. 1993).
Ratnakar et al., "RD-OPT: An Efficient Algorithm for Optimizing DCT Quantization Tables," *IEEE*, pp. 332-341 (Mar. 1995).

Reader, "History of MPEG Video Compression—Ver. 4.0," 99 pp. (document marked Dec. 16, 2003).

Reed et al., "Constrained Bit-Rate Control for Very Low Bit-Rate Streaming-Video Applications," *IEEE Transactions on Circuits and Systems for Video Technology*, vol. 11, No. 7, pp. 882-889 (Jul. 2001).

Reibman et al., "Constraints on Variable Bit-rate Video for ATM Networks," *IEEE Transactions on Circuits and Systems for Video Technology*, No. 4, pp. 361-372 (Dec. 1992).

Reibman et al., "Video Quality Estimation for Internet Streaming," *Int'l Conf. on World Wide Web*, pp. 1168-1169 (2005).

Rexford et al., "Online Smoothing of Live, Variable-Bit-Rate Video," *IEEE*, pp. 235-243 (May 1997).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Ronda et al., "Rate Control and Bit Allocation for MPEG-4," *IEEE Transactions on Circuits and Systems for Video Technology*, pp. 1243-1258 (Dec. 1999).

Schulzrinne, "Operating System Issues for Continuous Media," *ACM Multimedia Systems*, vol. 4, No. 5, 13 pp. (Mar. 1996).

Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Sheu et al., "A Buffer Allocation Mechanism for VBR Video Playback," Communication Tech. Proc. 2000, WCC-ICCT 2000, vol. 2, pp. 1641-1644 (Aug. 2000).

Sidiropoulos, "Optimal Adaptive Scalar Quantization and Image Compression," *ICIP*, pp. 574-578 (Oct. 1998).

Srinivasan et al., "High-Quality Audio Compression Using an Adaptive Wavelet Packet Decomposition and Psychoacoustic Modeling," *IEEE Transactions on Signal Processing*, vol. 46, No. 4, pp. 1085-1093 (Apr. 1998).

Srinivasan et al., "Windows Media Video 9: Overview and Applications," *Signal Processing: Image Communication*, vol. 19, pp. 851-875 (Oct. 2004).

Sullivan, "Optimal Entropy Constrained Scalar Quantization for Exponential and Laplacian Random Variables," *ICASSP*, pp. V-265-V-268 (Apr. 1994).

Sullivan et al., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Sun et al., "Seamless Switching of Scalable Video Bitstreams for Efficient Streaming," *IEEE Transactions on Multimedia*, vol. 6, No. 2, pp. 291-303 (Apr. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Trushkin, "On the Design on an Optimal Quantizer," *IEEE Transactions on Information Theory*, vol. 39, No. 4, pp. 1180-1194 (Jul. 1993).

Tsang et al., "Fuzzy based rate control for real-time MPEG video," 12 pp. (Nov. 1998).

Walpole et al., "A Player for Adaptive MPEG Video Streaming over the Internet," *Proc. SPIE*, vol. 3240, pp. 270-281 (Mar. 1998).

Westerink et al., "Two-pass MPEG-2 Variable-bit-rate Encoding," *IBM J. Res. Develop.*, vol. 43, No. 4, pp. 471-488 (Jul. 1999).

Wong, "Progressively Adaptive Scalar Quantization," *ICIP*, pp. 357-360 (Sep. 1996).

Wu et al., "Entropy-Constrained Scalar Quantization and Minimum Entropy with Error Bound by Discrete Wavelet Transforms in Image Compression," *IEEE Transactions on Image Processing*, vol. 48, No. 4, pp. 1133-1143 (Apr. 2000).

Wu et al., "Quantizer Monotonicities and Globally Optimally Scalar Quantizer Design," *IEEE Transactions on Information Theory*, vol. 39, No. 3, pp. 1049-1053 (May 1993).

Wu et al., "SMART: An Efficient, Scalable and Robust Streaming Video System," *EURASIP on Applied Signal Processing*, vol. 2, 39 pp. (Feb. 2004).

Yang et al., "Rate Control for Videophone Using Local Perceptual Cues," *IEEE Transactions on Circuits and Systems for Video Tech.*, vol. 15, No. 4, pp. 496-507 (Apr. 2005).

Zhang et al., "Seamless Bit-Stream Switching in Multirate-Based Video Streaming Systems," *EURASIP Journal on Applied Signal Processing*, pp. 1-11 (2006).

Zheng et al., "Multimedia Over High Speed Networks: Reducing Network Requirements with Fast Buffer Fillup," *IEEE GLOBECOM-98*, 6 pp. (Nov. 1998).

U.S. Appl. No. 11/260,650.
U.S. Appl. No. 09/771,371.
U.S. Appl. No. 10/017,694.
U.S. Appl. No. 11/066,859.
U.S. Appl. No. 11/067,018.
U.S. Appl. No. 11/066,860.
U.S. Appl. No. 11/066,898.
U.S. Appl. No. 11/066,897.
U.S. Appl. No. 11/067,170.
U.S. Appl. No. 11/260,027.
U.S. Appl. No. 11/599,686.
U.S. Appl. No. 10/623,338.
U.S. Appl. No. 12/004,909.
U.S. Appl. No. 10/622,822.
U.S. Appl. No. 12/119,364.
U.S. Appl. No. 12/116,878.
U.S. Appl. No. 12/242,524.
U.S. Appl. No. 12/188,074.
U.S. Appl. No. 12/188,079.
U.S. Appl. No. 12/188,085.
U.S. Appl. No. 12/188,087.

\* cited by examiner software 180 implementing server-side and/or client-side functionality
for fine-grained client-side control of scalable media delivery

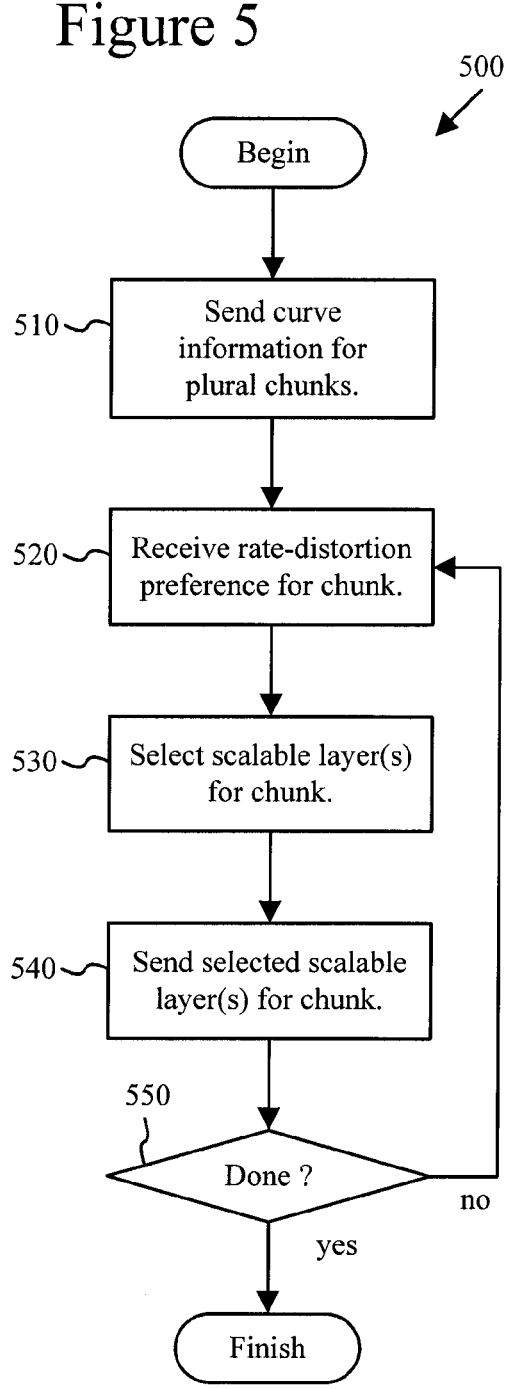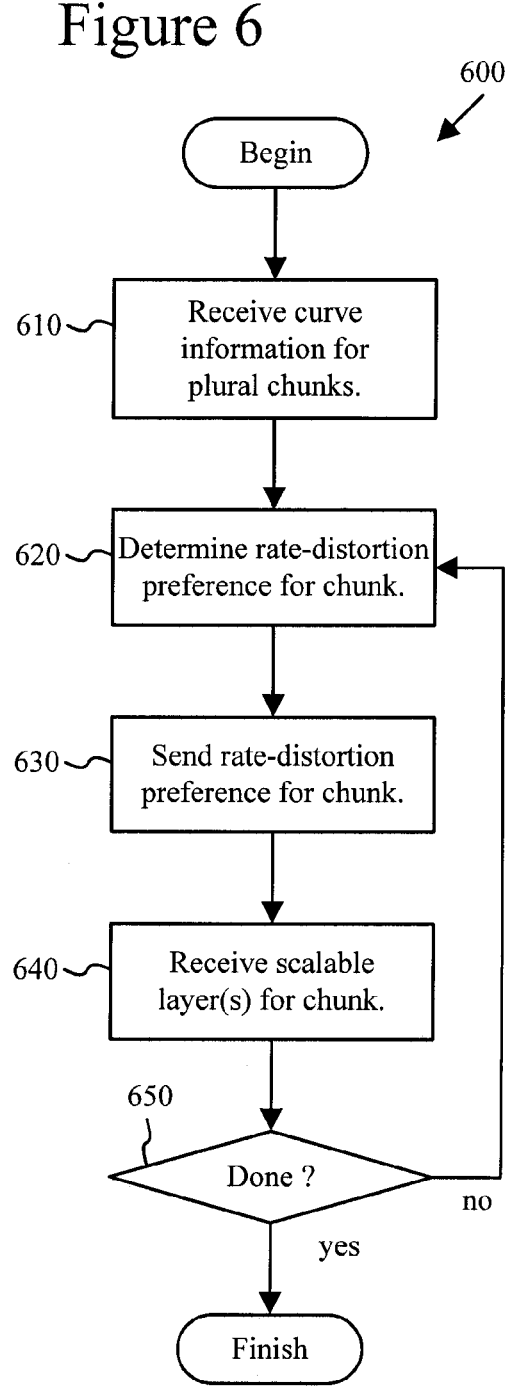

FINE-GRAINED CLIENT-SIDE CONTROL OF SCALABLE MEDIA DELIVERY

BACKGROUND

Engineers use compression (also called coding or encoding) to reduce the bit rate of digital media. Compression decreases the cost of storing and transmitting media by converting the media into a lower bit rate form. Decompression (also called decoding) reconstructs a version of the original media from the compressed form.

When it converts media to a lower bit rate form, a media encoder can decrease the quality of the compressed media to reduce bit rate. By selectively removing detail in the media, the encoder makes the media simpler and easier to compress, but the compressed media is less faithful to the original media. Aside from this basic quality/bit rate tradeoff, the bit rate of the media depends on the content (e.g., complexity) of the media and the format of the media.

Media information is organized according to different formats for different devices and applications. Many attributes of format relate to resolution. For video, for example, sample depth, spatial resolution (e.g., in terms of width and height of a picture) and temporal resolution (e.g., in terms of number of pictures per second) relate to resolution. For audio, sample depth and sampling rate (e.g., in terms of number of samples per second) relate to resolution. Typically, quality and bit rate vary directly for resolution, with higher resolution resulting in higher quality and higher bit rate.

Scalable media encoding and decoding facilitate delivery of media to devices with different capabilities. A typical scalable media encoder splits media into a base layer and one or more enhancement layers. By itself the base layer provides a version of the media for reconstruction at a lower quality, and the enhancement layer(s) add information that will increase quality. Some scalable encoders and decoders rely on temporal scalability of media (e.g., low frame rate to high frame rate). Other common scalable encoding/decoding schemes use scalability for either the spatial resolution or the overall encoding quality of the video (e.g., low distortion to high distortion). Scalable layers can represent different quality points for a single type of resolution (e.g., for three different spatial resolutions 320×240, 640×480 and 1280×960). Or, scalable layers can represent different quality points for different types of resolution (e.g., for a 320×240 low quality base layer, a 640×480 low quality enhancement layer, a 320×240 higher quality enhancement layer, a 640×480 higher quality enhancement layer, and so on).

The base layer and one or more enhancement layers can be organized in separate bit streams for the respective layers. Or, the content for the respective scalable layers can be interleaved unit-by-unit for the encoded media. For example, for a first frame of audio, base layer data for the first frame precedes first enhancement layer data for the first frame, which precedes second enhancement layer data for the first frame. Then, base layer data, first enhancement layer data, and second enhancement layer data. follow for a second frame of audio. For video, the unit can be a picture or group of pictures, with base layer data and enhancement layer data organized by unit.

When scalable layers represent different quality points for a single type of resolution, and the scalable layers are organized unit-by-unit in a bit stream, the one or more layer(s) for low quality can be considered "embedded" within the layer for the next higher quality. These layers in turn can be considered embedded within the layer for the next higher quality. Selecting a target quality/bit rate can be accomplished by selecting a set of nested layers of encoded data for each of the units. One approach to creating an embedded bit stream with layers for different quality levels uses bit plane coding. In bit plane coding, the frequency transform coefficients for blocks of a picture are separated into a first plane have the most significant bit for each transform coefficient, a second plane having the next most significant bit for each coefficient, and so on, through the plane having the least significant bit for each coefficient. The respective bit planes are encoded in different scalable layers for different levels of encoding quality.

Delivering media content over the Internet and other computer networks has become more popular. Media delivery over the Internet is typically characterized by variable bandwidth, without dedicated bandwidth between a media server that distributes media content and a media client that plays back the media content. If the bit rate of media content is too high, the media content may be dropped by the network, causing playback by the media client to stall. Alternatively, the media client can buffer a large portion of the media content before playback begins, but this results in a long delay before playback starts. On the other hand, if the bit rate of the media content is much lower than the network could deliver, the quality of the media content played back will be lower than it could be. By adjusting bit rate of media content so that bit rate more closely matches available network bandwidth, a media server can improve the media client's playback experience. While existing ways of adjusting quality and bit rate of media content provide adequate performance in many scenarios, they do not have the benefits and advantages of the techniques and tools described below.

SUMMARY

In summary, the detailed description presents techniques and tools for adjusting the quality and bit rate of media delivered over a network. For example, for multiple independent chunks of media, a scalable media encoder encodes each chunk at multiple bit rates/quality levels for fine-grained scalability, and a server stores the encoded media. Depending on network characteristics and client playback preferences, for each of the multiple chunks, a client chooses a bit rate/quality level, and a scalable media decoder decodes the encoded media delivered to it at the selected quality level. Increasing the number of bit rate/quality level options for the multiple chunks allows the client to more precisely tailor its selections to satisfy client playback preferences and adapt to changes in media bit rate or network characteristics.

According to a first aspect of the techniques and tools described herein, a tool such as a server delivers media data organized as multiple chunks. Each of the multiple chunks is encoded as multiple scalable layers for different quality levels with fine-grained scalability. The tool sends curve information for the chunks. For a given chunk, the curve information can include rate-distortion points that parameterize a rate-distortion curve for the chunk. Or, the curve information can include a set of parameters that indicate the shape of a rate-distortion curve for the chunk. For each of the multiple chunks, the tool receives feedback that indicates a rate-distortion preference and, based at least in part upon the feedback, selects one or more scalable layers from among the scalable layers of the chunk. For example, a server sends the curve information to a given media client, receives the feedback from the given media client, and sends selected layer(s) back to the given media client. When it stores scalable layers and curve information for chunks, the server can deliver the curve information and selected layers to different media clients at different times.

For example, the multiple scalable layers for a chunk include a base layer and multiple residual layers. The multiple residual layers can be residual embedded layers resulting from bit plane encoding of the chunk, where each of the embedded layers represents a bit plane of transform coefficients of the chunk. When delivering layers for a chunk, the tool always selects and sends the base layer for the chunk. Depending on rate-distortion preferences, the tool selects and sends zero or more of the multiple residual layers for the chunk.

According to a second aspect of the techniques and tools described herein, a tool such as a media client processes media data organized as multiple chunks, where each of the multiple chunks has been encoded as multiple scalable layers for different quality levels with fine-grained scalability. The tool receives curve information for the multiple chunks. For each of the chunks, the tool determines a rate-distortion preference for the chunk (e.g., in terms of a count of bits or range of bits) and sends the rate-distortion preference. The tool then receives one or more scalable layers from among the multiple scalable layers of the chunk. For example, a media client receives the curve information from a given server, sends the rate-distortion preferences to the server, and then receives the selected layer(s) back from the server.

For a given chunk, the curve information can include rate-distortion information that the tool uses to determine distortion as a function of download time for the scalable layers of the chunk. When determining a rate distortion preference, for example, for a segment of one or more of the chunks, the tool determines an overall playback time constraint for the segment. For each of the one or more chunks in the segment, the tool selects a download time so as to reduce overall distortion among the one or more chunks in the segment, while also satisfying the overall playback time constraint for the segment. The selection of the download time can include setting a weight parameter such that cumulative download time for the segment matches the overall playback time constraint. For segments that include multiple chunks, the selection of the download times for the chunks can include splitting the segment into multiple sub-segments. Then, for each of the multiple sub-segments, the tool determines an overall playback time constraint for the sub-segment and, for each of one or more chunks in the sub-segment, selects a download time so as to reduce overall distortion among the one or more chunks in the sub-segment, while also satisfying the overall playback time constraint for the sub-segment.

According to a third aspect of the techniques and tools described herein, a tool such as a media client receives a stream header for media data organized as multiple chunks, where each of the multiple chunks has been encoded as multiple scalable layers for different quality levels with fine-grained scalability. The tool receives curve information for the multiple chunks. For each of the multiple chunks, the curve information for the chunk indicates a different rate-distortion point associated with each of the multiple scalable layers for the chunk. The tool determines rate-distortion preferences for the multiple chunks, respectively, and sends the rate-distortion preferences. For each of the multiple chunks, the tool receives one or more scalable layers of the chunk.

The foregoing and other objects, features, and advantages will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

FIG. 5 is a flow chart illustrating a generalized technique for delivering curve information and scalable layers of media to a client.

FIG. 6 is a flow chart illustrating a generalized technique for processing curve information and requesting scalable layers of media from a server.

DETAILED DESCRIPTION

Figure 1:
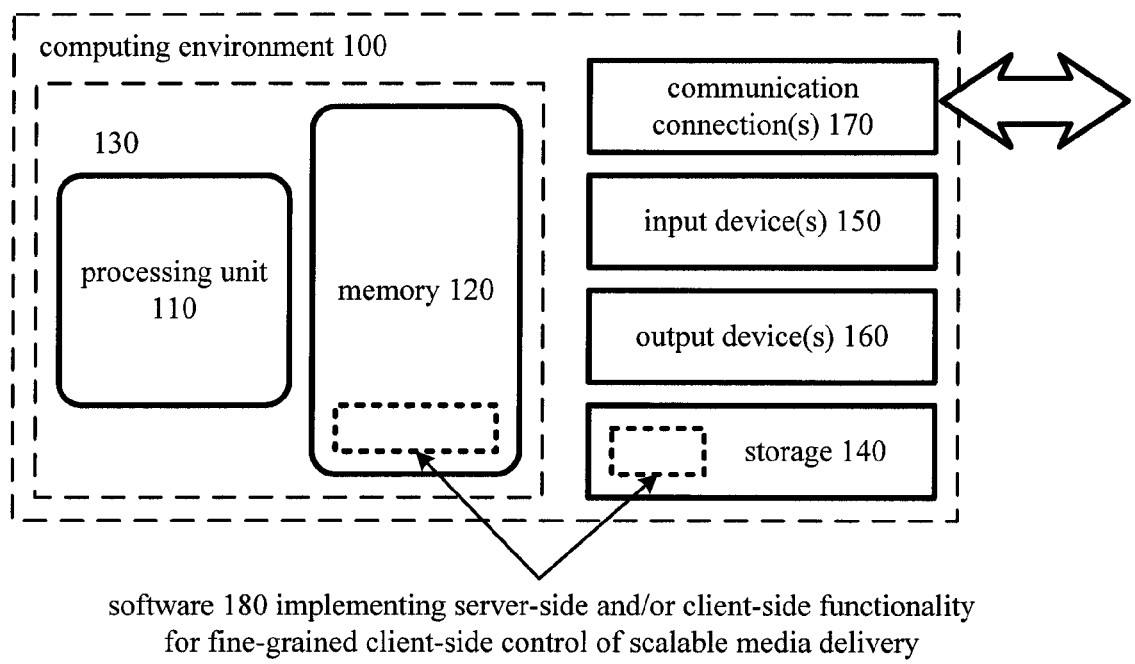
FIG. 1 is a block diagram illustrating a suitable computing environment in which several described techniques and tools may be implemented.

The present application relates to techniques and tools for fine-grained client-side control of scalable media delivery. These techniques and tools allow a client to customize its playback experience by selecting bit rates/quality levels of media. Increasing the number of bit rate/quality level options used in encoding chunks of media allows the client to more precisely tailor its selections to its playback preferences, changes in media complexity and changes in network conditions.

For example, a server stores chunks of media content that have been scalably encoded at multiple bit rates (and hence multiple quality levels). To a client, the server sends information about the multiple bit rates/quality levels available for the chunks. Considering the information, the client customizes its playback experience by choosing a bit rate/quality level for each the chunks the client wishes to play back. In deciding which bit rates/quality levels to select, the client can consider various factors. The client can choose a bit rate/quality level for each chunk to be played back so as to have the best quality possible, subject to constraints such as network conditions between the server and client, preferred start up latency and preferred tolerance to glitching. Network conditions include network bandwidth and network delay time, which can change over time due to network congestion or other factors. Start up latency refers to delay while the client buffers media content before starting to decode and play back the media content. Increasing start up delay allows the client to buffer more media content, which typically allows the client to increase overall quality level. Users usually prefer small start up latency so that playback begins sooner, however. The term glitching refers to interruptions in playback due to missing data. For example, when a decoder reaches a frame of audio or video during playback but is missing data needed to decode the frame, the decoder stops playback or attempts to conceal the missing part. Typically, a client has little or no tolerance for glitching. Alternatively, the client considers other and/or additional factors.

In some implementations, a scalable media encoder uses bit plane coding of frequency coefficients of media content. A client chooses a bit rate/quality level for a chunk by selecting one or more bit planes from an embedded bit stream. This is analogous to allowing the client to perform simple rate-distortion quantization of the coefficients encoded. While bit plane selection does not allow the client to control encoder settings such as transform block sizes or filter parameters, it provides a way for different clients to customize the results of encoding that those clients play back. The granularity of rate and quality control depends on the size of chunks and number of bit planes. Having more bit planes per chunk and smaller chunks provides more fine-grained control to clients, while having fewer bit planes per chunk or larger chunks gives clients fewer options and coarser granularity of control. Depending on implementation, the scalable media encoder can use finer scalability (e.g., down to levels approaching bit granularity) or coarser scalability (e.g., with a base layer and a few residual layers) in an embedded representation, so long as truncation at any of the multiple rate/quality points per chunk results in a valid bit stream. Alternatively, the scalable media encoder provides scalable layers but does not use bit plane coding or an embedded bit stream.

In addition to providing a client with the ability to switch bit rates and qualities at chunk boundaries, in some implementations, scalable media delivery architectures described herein are implemented in conjunction with large scale content delivery networks ("CDNs"). For example, a CDN used to deliver Web content with HTTP packets can also cache media content for delivery to clients. When a CDN includes multiple servers that cache media content at distributed geographical locations, client-server download times can be decreased due to geographical proximity and server load balancing. Moreover, although caching limitations on some CDNs make caching of large files problematic, fine-grained scalability results in smaller file sizes for the layers of encoded chunks of media content in some implementations. To exploit advantages of client-side rate control, a server in the CDN stores media encoded with a large number of rates and quality levels, where different rates correspond to different sets of files for a given chunk. For example, an embedded bit stream output from a scalable media encoder is split into different files for a chunk (with different levels of bit stream truncation corresponding to different levels of quantization of coefficients), and a server in an existing CDN stores the different files, which facilitates fine-grained rate control by clients without server-side modifications to the server of the existing CDN. Alternatively, instead of having truncation points for different scalable layers align with file boundaries of separate files (such that the client, when indicating its rate-distortion preference, requests a certain set of files in their entirety or requests a number of bits that corresponds to the set of files), the server can store a single file with an embedded bit stream for the different scalable layers. In that case, the server truncates the bit stream at an arbitrary location in the single file in response to a rate-distortion preference (e.g., byte range request) from the client. Or, the server can use a combination of these mechanisms, storing an embedded bit stream for at least part of one or more different layers in each of multiple files. In response to a rate-distortion preference from a client (e.g., to send file0, file1 and file2 in their entirety and send only bytes 0 to 900 of file3 for chunk7, or to send 6,300 bytes for chunk7), the server can send one or more entire files and/or part of a file that corresponds to a truncation point in an embedded bit stream.

Innovative aspects of the techniques and tools described herein include, but are not limited to, the following.

1. The use of scalable media encoders and decoders for fine-grained, client-side rate control. Fine-grained, client-side rate control allows different clients to precisely customize media delivery and playback to their respective situations.

2. The use of curve information indicating rate-distortion characteristics for scalable layers of a chunk of media content. A server stores curve information for chunks and sends the curve information to a client, which evaluates the curve information and determines a rate-distortion preference for each of the chunks. Different chunks typically have different curve information. The curve information effectively parameterizes the rate-distortion properties of the respective chunks for fine-grained client-side rate control.

3. The decision-making processes a client uses when evaluating rate-distortion curve information to determine which bit rates/quality levels of media content to request. By using rate-distortion curve information to determine distortion as a function of download time, the decision-making processes help the client to improve rate-distortion performance while also considering network conditions and its playback preferences.

4. The use of request mechanisms of existing HTTP CDNs (e.g., byte range GET requests) to obtain a desired number of bits of media content. Leveraging existing CDN infrastructure simplifies the implementation of scalable media delivery with fine-grained, client-side rate control. Utilizing existing HTTP servers, which are already prevalent, helps avoid the need to use dedicated media servers.

Various alternatives to the implementations described herein are possible. Certain techniques described with reference to flowchart diagrams can be altered by changing the ordering of stages shown in the flowcharts, by splitting, repeating or omitting certain stages, etc. The different aspects of the fine-grained client-side control of scalable media delivery can be used in combination or separately. Different embodiments implement one or more of the described techniques and tools.

Some of the techniques and tools described herein address one or more of the problems noted in the background. Typically, a given technique/tool does not solve all such problems.

I. COMPUTING ENVIRONMENT

FIG. 1 illustrates a generalized example of a suitable computing environment (100) in which several of the described techniques and tools may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing server-side and/or client-side functionality for fine-grained client-side control of scalable media delivery.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing server-side and/or client-side functionality for fine-grained client-side control of scalable media delivery.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "select" and "reconstruct" to describe computer operations in a computing environment. These terms are high-level abstractions for operations performed by a computer, and should not be confused with acts performed by a human being. The actual computer operations corresponding to these terms vary depending on implementation.

II. NETWORK ENVIRONMENT

Figure 2:
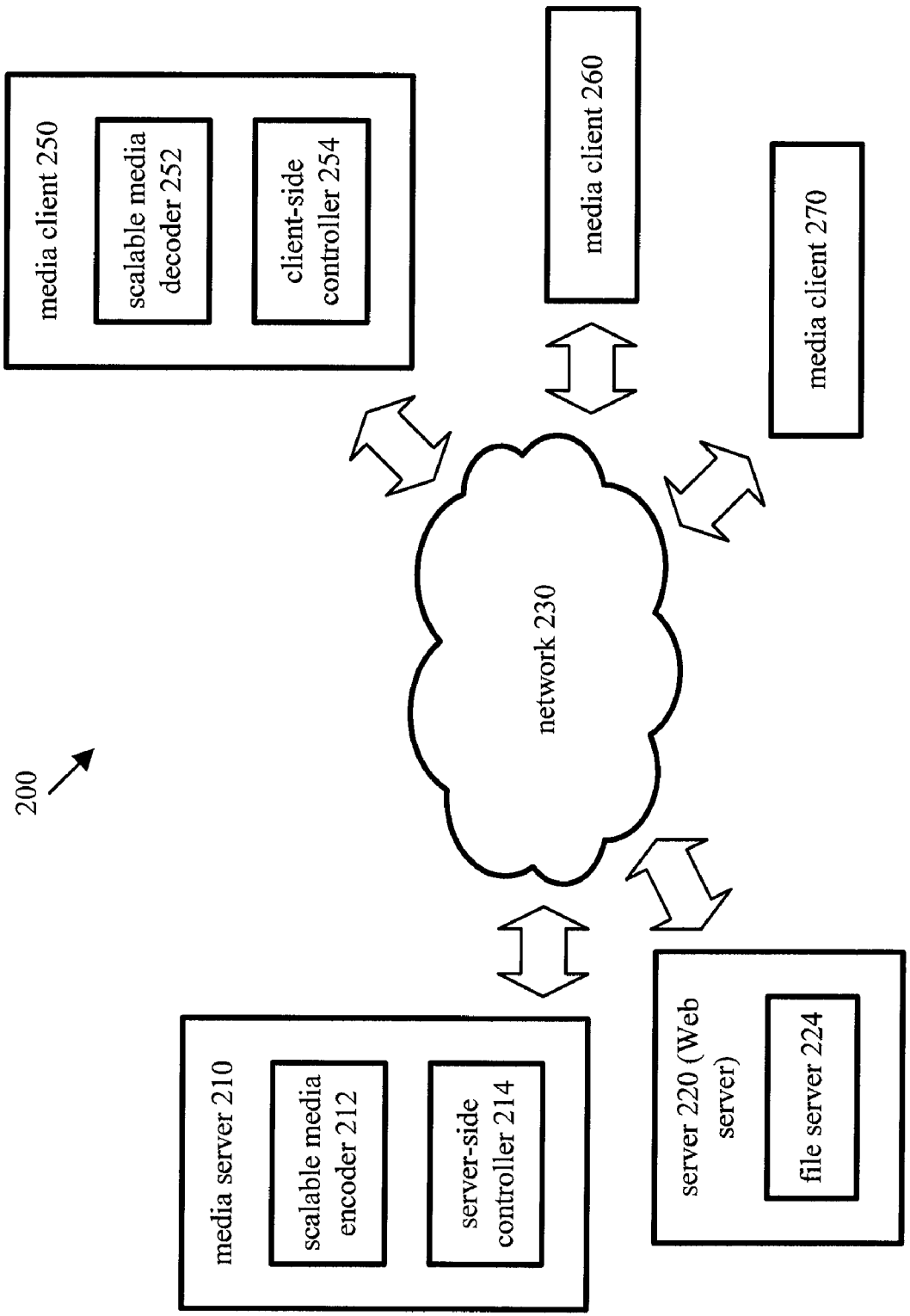
FIG. 2 is a diagram illustrating an example scalable media delivery system in which several described techniques and tools may be implemented.

FIG. 2 shows an example scalable media delivery system (200) including servers (210, 220) that distribute media content over a network (230) to multiple media clients (250, 260, 270). The network (230) can include the Internet or another computer network.

The media server (210) includes a scalable media encoder (212) for encoding media such as audio or video. The scalable media encoder (212) codes an individual chunk of media as different quality/bit rate layers, which facilitates scalability that can be fine-grained or coarse-grained, depending on the number of different layers. The scalable media encoder (212) can use bit plane coding of spectral coefficients of the media to produce embedded layers. With such embedded layers, a media client's request for a desired number or range of bits results in selection of a set of layers at or just under the desired number of bits. Alternatively, the scalable media encoder (212) uses another encoding scheme. Moreover, although FIG. 2 shows the scalable media encoder (212) together with the server-side controller (214) in the media server (210), alternatively the media server (210) receives encoded media content from a scalable media encoder outside the media server (210).

The media server (210) stores encoded data in the form of scalable layers of each chunk of the media along with header information for the media (e.g., a stream header). In addition, the media server (210) stores rate-distortion curve information for each of the chunks. For example, the rate-distortion curve information includes quality (or distortion) information as well as rate information for each scalable layer of a given chunk. Alternatively, a set of parameters indicates the shape of a rate-distortion curve for a given chunk. The media server (210) can store different scalable layers for a chunk in different files, store a single file with the different scalable layers organized as an embedded bit stream, or store multiple files each having an embedded bit stream for at least part of one or more of the different scalable layers.

The server-side media controller (214) manages connections with one or more media clients (250, 260, 270). When a given media client requests a media stream, the server-side media controller (214) sends a stream header for the stream to the media client, along with rate-distortion curve information for some or all of the chunks in the media stream. For a chunk, the server-side media controller (214) eventually receives feedback from the media client, indicating a rate-distortion preference for the chunk. Considering the rate-distortion preference for the chunk, the server-side controller (214) selects one or more of the scalable layers for the chunk and sends the selected layer(s) to the media client. For example, the server-side controller (214) selects scalable layers that collectively meet, or come close to meeting, the rate-distortion preference of the media client for the chunk. Generally, the media server (210) and server-side media controller (214) are "dumb" in that they react to feedback from clients (250, 260, 270) in a simple and straightforward way. This helps the server (210) manage connections with a large number of clients concurrently, and it simplifies the task of adapting existing servers to cooperate in fine-grained client-side control of media delivery.

In FIG. 2, the second server (220) illustrates an example implementation in which the server (220) is simply a Web server that stores and serves files for different scalable layers of chunks of media content. The media content is encoded, for example, offline by a separate scalable media encoder. The server (220) stores different scalable layers for a given chunk as different files, or as a single file with the different scalable layers organized as an embedded bit stream, or as multiple files each having an embedded bit stream for at least part of one or more of the different scalable layers. The server (220) also stores program description information for a stream header and rate-distortion curve information for the chunks of media content. In the server (220), the server-side controller is implemented as a file server (224) that retrieves files or ranges of files to send to one or more of the media clients (250, 260, 270). One of the clients (250, 260, 270) requests a header file (e.g., including program description information and rate-distortion curve information), which the server (220) simply serves to the client. The client then requests files or ranges of files corresponding to scalable layers of chunks of the media content, and the server (220) simply serves the requested content to the client.

The media client (250) includes a client-side controller (254) and scalable media decoder (252) for decoding media such as audio or video. After a media stream has been requested, the client-side controller (254) receives a stream header as well as rate-distortion curve information for some or all of the chunks in the media stream. For a long stream or a stream being delivered with short delay after capture, the client-side controller may receive rate-distortion curve information for a subset of the chunks, with more curve information provided later for other chunks.

The media client (250) has a buffer that temporarily stores encoded data for the media stream before decoding. Based upon rate-distortion information for a chunk as well as criteria such as buffer fullness (which may be a function of desired latency, the bit rate and playback rate of previously downloaded chunks, and network conditions) and/or estimated download times (as a function of rate and chunk), the client-side controller (254) finds a rate-distortion preference for the chunk. For example, the client-side controller (254) finds a rate allocation for the chunk and requests a number or range of bits for the chunk. In some implementations, the client-side controller (254) sends a byte range request GET for the bits for the chunk. Or, the client-side controller sends a request for specific files and/or ranges of files corresponding to the rate-distortion preference for the chunk.

The scalable media decoder (252) decodes individual chunks of media that were encoded as different quality/bit rate layers. The scalable media decoder (252) can use bit plane decoding of spectral coefficients of the media. Generally, the scalable media decoder (252) reconstructs a chunk using layers received by the client-side controller (254) in response to a request for a desired number or range of bits for the chunk. Alternatively, the scalable media decoder (252) uses another decoding scheme. Moreover, although FIG. 2 shows the scalable media decoder (252) together with the client-side controller (254) in the media client (250), alternatively the media client (250) outputs encoded media content to a scalable media decoder outside the media client (250).

III. EXAMPLE SCALABLE MEDIA ORGANIZATION AND FILE FORMATS

In conjunction with fine-grained client-side control of scalable media delivery, a scalable media encoder and decoder can use any of various encoding/decoding techniques and file formats for encoded data. This section describes example file formats and ways of organizing encoded media.

An encoder divides media content into chunks that are coded independently. Constraining encoding so that chunk-to-chunk dependencies are avoided facilitates random access functionality since decoding can begin at any given chunk. For video, for example, a chunk can be a closed group of pictures ("GOP") including an intra-coded picture and inter-coded pictures following it, with no dependencies on pictures outside the GOP. For audio, in many encoding approaches, frames of audio samples lack frame-to-frame dependencies, and a chunk is some integer number of frames. Operations such as overlap-add operations for samples at the beginning of an initial frame at a seek position are ignored after random access. Generally, the partitioning of media content into independent chunks depends on implementation. Different types of media chunks need not be synchronized on chunk boundaries.

Alternatively, an encoder constrains dependencies between chunks to allow dependencies between lowest bit rate versions of the chunks. Allowing dependencies between chunks can facilitate greater compression efficiency, at some cost to random access functionality. For example, when starting playback at a seek position, a client downloads and reconstructs previous chunks upon which the chunk at the seek position depends.

Once the content is divided into individual chunks, an encoder encodes the chunks at multiple bit rates (and hence multiple quality levels). The bit rate of a chunk of encoded media corresponds to a file size for the chunk, assuming a constant transmission rate. To improve the flexibility of client-side rate control, a server increases the number of bit rates (and quality levels) available. In some implementations, an encoder uses an embedded bit stream from the output of scalable media encoding to achieve fine-grained scalability. Bit stream truncation sets a level of quantization for respective coefficients of a chunk, selecting a bit rate/quality level point. Essentially, regulating quantization of the coefficients allows a client to control rate-distortion performance for the coefficients that the client requests. It does not, however, allow the client to control more complicated encoding settings. Typically, this does not significantly hurt quality so long as the range of bit rates is not very large, at which point the encoder might otherwise use different settings at different quality/rate extremes. Alternatively, the media encoding uses scalable encoding along a spatial, temporal, color space and/or sample depth dimension, apart from bit plane coding or in combination with bit plane coding.

The granularity of the scalability depends on implementation. Theoretically, the granularity can be as fine as bit-level granularity. In practice, for a given chunk, using a base layer and a desired number of residual layers usually provides clients with an acceptable number of bit rate/quality level points, so long as arbitrary selection of different bit rates/quality levels for different chunks results in a valid bit stream.

Figure 3:
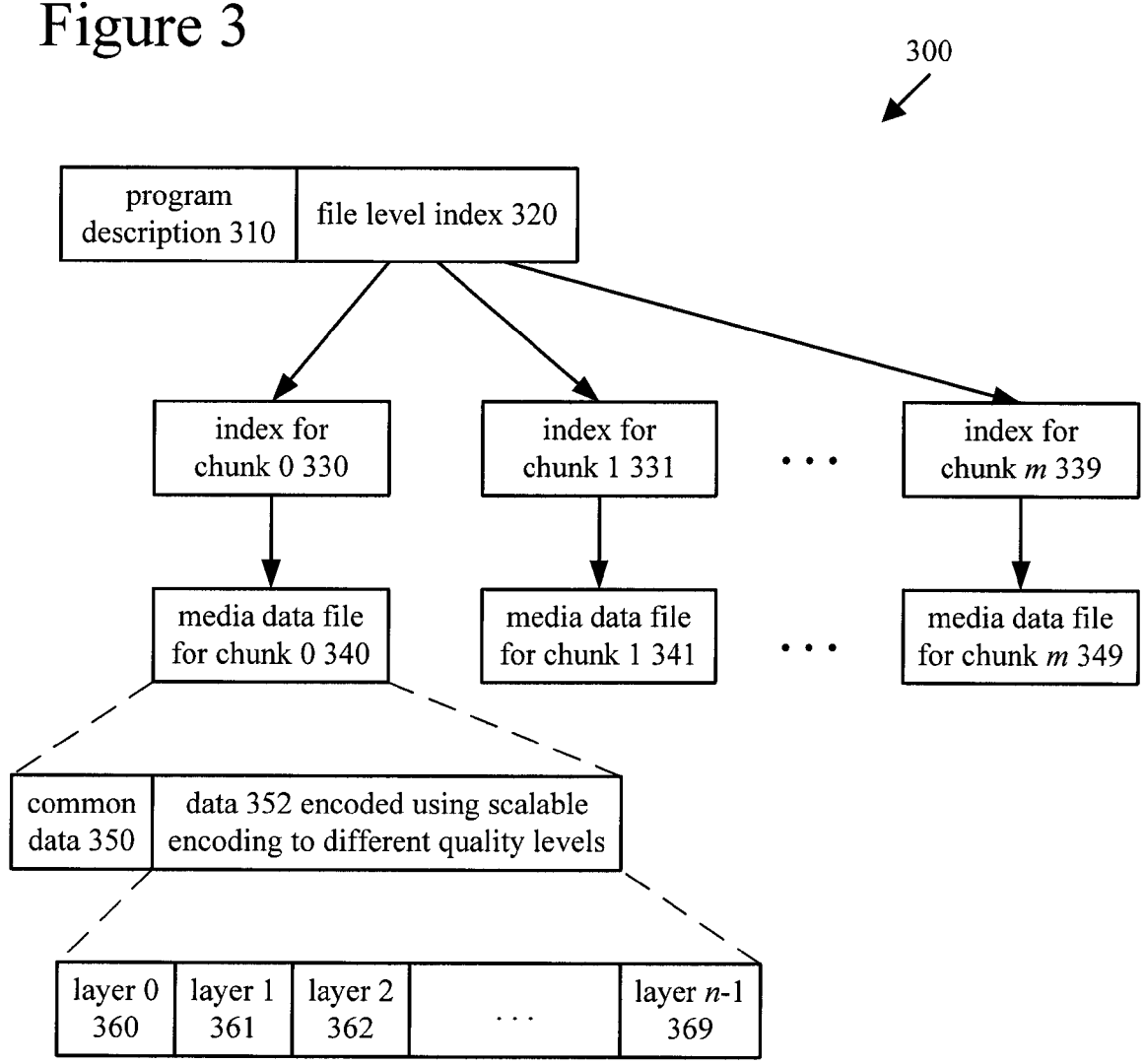
FIG. 3 is a diagram illustrating an example file format for encoded media organized in chunks having scalable layers.

FIG. 3 shows an example file format for a file (300) of encoded chunks of media content. The organization of the file (300) helps a server deliver the media content to different clients at different rates/quality levels. For additional details about file formats in some implementations, see U.S. patent Ser. No. 12/119,364, entitled "Optimized Client Side Rate Control and Indexed File Layout for Streaming Media," filed May 12, 2008, the disclosure of which is hereby incorporated by reference. Alternatively, a server uses a file of another format for encoded chunks of media data.

The file (300) has a program description field (310) that includes parameters about the entire stream of media content. The parameters can include metadata about the stream as well as information about encoding/decoding settings.

The file (300) also includes a file-level index (320) for the stream. The index (320) stores rate-distortion curve information for the chunks of media content in the stream. For example, the index (320) stores the number of bit rate/quality levels available for a chunk, along with size information and quality information for each of the levels, which indicate points on a rate-distortion curve for the chunk. Or, more generally, the index (320) stores rate-distortion curve information parameterized in some other way for a chunk, for example, as a parametric representation.

FIG. 3 shows data in the file (300) for m chunks. An index (330) for chunk 0 references a media data file (340) for chunk 0, an index (331) for chunk 1 references a media data file (341) for chunk 1, and so on. FIG. 3 shows the details of the media data file (340) for chunk 0, which includes a common data field (350) and a layer data field (352) with data for n different bit rate/quality layers that can have variable size. The common data field (350) includes encoding/decoding parameters and other information that are always used when playing back the chunk. The layer data field (352) includes a base layer 0 (360) and n-1 residual layers (361, 362, 369) that result from scalable media encoding of the chunk into n layers that can have variable size. For example, the n-1 residual layers (361, 362, 369) store coded spectral coefficient data split from an embedded bit stream. In some implementations, each of the layers (360 . . . 369) stores at least part of one or more different scalable layers as an embedded bit stream.

To play back the stream, a client requests and receives the program description field (310) and file-level index (320) for the stream. For each chunk, the client requests and receives common data (350) and, considering the file-level index (320) information that applies for the chunk, requests (e.g., using byte range requests) and receives zero or more of layers (or ranges thereof) from the layer data field (352) for the chunk. Typically, the layer data field (352) uses most of the bit rate for the chunk, and the client selects a rate/quality point for playback of the chunk by selecting how much of the layer data field (352) to request.

According to the file format of the file (300) shown in FIG. 3, a scalable media encoder produces n scalable layers that are divided into the layer data field (352) for a chunk, with the file-level index (320) storing information indicating size and distortion for the respective n scalable layers of the chunk. A client can use a byte range request or other mechanism to get a desired number of layers. Alternatively, a scalable media encoder produces an embedded bit stream in which each bit (or byte) can be considered an individual layer, and the number of bits (or bytes) is the number of fixed-size layers. In this case, the server need not store or send size information for layers, as a client simply requests a desired number of bits (or bytes) from the layer data field (352). Some example implementations of the fine-grained client-side control of media delivery thus work in conjunction with bit plane coding of media that provides very fine grain scalability, for example, as transform coefficients are organized for flexible partitioning at an arbitrary rate-distortion point.

IV. THEORY AND EXAMPLES

Simplified examples in this section illustrate principles of rate-distortion optimization and other optimization for streams of scalable media.

A. Rate-Distortion Optimization

If layers have a fixed size (e.g., an integer N bytes per layer) and the total bit budget is an integer multiple of that fixed size (e.g., an integer Z×N bytes for a decoder buffer of the client), a client can use rate-distortion techniques to find an optimal rate allocation. (In general, as used herein, the term "optimal" describes a solution that satisfies some set of criteria better than other solutions according to some parameterization or modeling, which may or may not be optimal in absolute terms depending on circumstances, and the term "optimize" is used to indicate the process of finding such a solution.)

A stream includes M chunks. The distortion $D_i$ for the $i^{th}$ chunk is a function of rate as given by $D_i[R_i]$, where $R_i$ is the rate of the $i^{th}$ chunk (the number of bits used for the $i^{th}$ chunk). The count of bits downloaded over the channel between server and client while the $i^{th}$ chunk is played back is $B_i$, where the count of bits can vary over time for different chunks. $B_{-1}$ is an initial buffer fullness value, and $R_{-1}$ is assumed to be zero.

The client applies a constraint that the decoder buffer never starves (suffers from underflow). In other words, assuming minimal network connectivity, the decoder buffer always includes encoded data for a media chunk when the client is ready to decode and play back the media chunk. The client can also impose a constraint that the decoder buffer never overflows, or it can assume the availability of an unlimited about of storage space for the decoder buffer and ignore the overflow prevention constraint. To prevent buffer underflow at the point of playback of the $i^{th}$ chunk, the client checks the constraint:

$$\sum_{j=0}^{i} R_j \leq \sum_{j=-1}^{i-1} B_j = CumulativeB_i,$$

and the client checks this buffer underflow prevention constraint for all chunks in the segment up to i. Thus, for chunk 0, the client checks the constraint $R_0 \leq B_{-1}$, which means the bits used for chunk 0 must be less than the initial buffer fullness, or, in other words, the bits for chunk 0 must be less than the number of bits downloaded during the initial startup delay. For chunk 1, the client checks the constraint $R_0+R_1 \leq B_{-1}+B_0$, which means the bits used for chunk 0 and chunk 1 must be less than the number of bits downloaded during the initial startup delay and playback of chunk 0, in order for playback of chunk 1 to begin on time. For chunk 2, the client checks the constraint $R_0+R_1+R_2 \leq B_{-1}+B_0+B_1$, and so on.

The client finds a set of rates for the M chunks of the media stream such that, subject to satisfaction of the buffer underflow prevention constraint for all of the M chunks, overall distortion $D_{total}$ is minimized:

$$D_{total} = \sum_{i=0}^{M-1} D_i[R_i].$$

A simpler problem is to find rate allocations given the buffer underflow prevention constraint for $CumulativeB_{M-1}$ as of the last of the M chunks. A solution to this simpler problem can be modeled using Lagrange multipliers and is equivalent to minimizing:

$$J = \sum_{i=0}^{M-1} (D_i[R_i] + \lambda R_i).$$

The client finds $\lambda$ to meet the buffer underflow prevention constraint $CumulativeB_{M-1}$. Taking the partial derivative with respect to the rates, and setting the result to zero to find an inflection point, yields $$\frac{\partial J}{\partial R_i} = \frac{\partial D_i}{\partial R_i} + \lambda = 0.$$

Suppose $$\frac{\partial D_i}{\partial R_i} = d_i[R_i],$$

a mapping of rate to the derivative. By substitution, it follows that the optimal rate allocation is $d_i[R_i]=-\lambda$. After applying an inverse function $d_i^{-1}[\ ]$ that maps derivative to rate, then $R_i=d_i^{-1}[-\lambda]$. To find the set of rates $R_i$ for the M chunks (for $i=0 \ldots M-1$) while also meeting the buffer underflow prevention constraint for CumulativeB$_{M-1}$ as of the last of the M chunks, the client finds $\lambda$ such that:

$$\sum_{i=0}^{M-1} d_i^{-1}[-\lambda] = CumulativeB_{M-1}.$$

Then, for any given chunk i in the segment from 0 to M−1, the optimal rate is given by $R_i=d_i^{-1}[-\lambda]$.

The factor $\lambda$ indicates a slope on the rate distortion curves for the M chunks. When the same factor $\lambda$ applies to all of the M chunks, for each of the chunks a rate-distortion point is selected at the same slope on the curve for the chunk, which is optimal considering the convex shapes of the curves. If bits were to be reallocated by giving bits from a first chunk to a second chunk, the increase in distortion for the first chunk (due to movement up a steeper part of the curve) would outweigh the decrease in distortion for the second chunk (due to movement down a less steep part of the curve). For a given overall buffer underflow prevention constraint, the client thus sets slope to be the same on the curves for the respective chunks at the points that the cumulative rates for the chunks meets the overall constraint.

If the optimal rate allocation that satisfies the buffer underflow prevention constraint for CumulativeB$_{M-1}$ also satisfies CumulativeB$_i$ for every other chunk i in the segment, then the client has found an acceptable set of rates for the M chunks. If the buffer underflow prevention constraint is violated for at least one chunk, however, the client removes bits from the portion that violates the constraint and reallocates them to the remainder of the chunks. For example, suppose the client checks for rate allocations that satisfy the overall constraint for CumulativeB$_{M-1}$, as well as rate allocations that satisfy the constraint for CumulativeB$_k$, where k<M. The client finds a value for the weight parameter $\lambda$ that satisfies the buffer underflow prevention constraint when i=M−1:

$$\sum_{i=0}^{M-1} d_i^{-1}[-\lambda] = \sum_{i=0}^{M-1} R_i \leq CumulativeB_{M-1},$$

but for this value of $\lambda$ the constraint is violated when i=k.

$$\sum_{i=0}^{k} d_i^{-1}[-\lambda] = \sum_{i=0}^{k} R_i > CumulativeB_k.$$

There can be multiple values of k for which the buffer underflow constraint is violated, in which case the client first focuses on the chunk with the lowest value of k that violates the constraint. The client thus finds different factors $\lambda_1$ and $\lambda_2$ for the ranges from $i=0, \ldots, k$ and $i=k+1, \ldots, M-1$, respectively, such that:

$$\sum_{i=0}^{k} d_i^{-1}[-\lambda_1] = CumulativeB_k,$$

and $$\sum_{i=k+1}^{M-1} d_i^{-1}[-\lambda_2] = CumulativeB_{M-1} - CumulativeB_k.$$

Then, for any chunk i between 0, ..., k, the client assigns a rate given by $R_i=d_i^{-1}[-\lambda_1]$, and for any chunk i between k+1, ..., M−1, the client assigns a rate given by $R_i=d_i^{-1}[-\lambda_2]$. On the other hand, reallocating bits by giving bits from chunks k+1 to M−1 to chunks 0 to k would violate the buffer underflow prevention constraint for one or more of chunks 0 to k. If there are additional constraints to satisfy for any chunk i between k+1, ..., M−1, the client recursively splits the range until constraints are satisfied for all of the M chunks.

For example, suppose a client finds rates for a segment of five chunks while satisfying the constraint $R_0+R_1+R_2+R_3+R_4 \leq B_{-1}+B_0+B_1+B_2+B_3$ for the segment overall. For those rates, the constraints $R_0 \leq B_{-1}$ and $R_0+R_1 \leq B_{-1}+B_0$ for the first two chunks are satisfied, but the constraint for the third chunk is violated: $R_0+R_1+R_2 > B_{-1}+B_0+B_1$. The client therefore finds rates (at lower bit rates/higher distortions) for a sub-segment of the first three chunks, for which the constraint $R_0+R_1+R_2 \leq B_{-1}+B_0+B_1$ is satisfied. (Since the cumulative rates allocated to the first three chunks have each been reduced, the constraints $R_0 \leq B_{-1}$ and $R_0+R_1 \leq B_{-1}+B_0$ are still satisfied.) The client then finds rates for another sub-segment of the final two chunks, for which the constraints $R_3 \leq B_2$ and $R_3+R_4 \leq B_2+B_3$ are satisfied. If any constraint in the second sub-segment is violated, the client recursively applies the same procedure to split the second sub-segment and find rates for the resulting new sub-segments.

B. Download Time-Distortion Optimization

Instead of focusing on rates and buffer fullness levels, a client can consider estimated download times for scalable layers of chunks (which depend on rates for the chunks and network characteristics) along with playback durations for the chunks and client playback preferences. The client selects scalable layers whose estimated download times allow timely playback, given the playback durations for the chunks, while also minimizing distortion. Thus, a server can store one set of rate-distortion information for scalable layers of chunks of media, with different clients using the rate-distortion information to customize their determinations of distortion as a function of download time considering network conditions and playback preferences for the respective clients.

In some implementations, the client assumes the estimated download time for a given chunk is a linear function of rate (e.g., assuming constant network bandwidth while encoded data for the chunk is downloaded, assuming changes in rate do not affect network bandwidth), such that a graph of distortion as a function of download time is convex. Even if estimated download time for a given chunk is not a linear function of rate, so long as the graph of distortion as a function of download time is convex, the client can use the following optimization approach.

Figure 4:
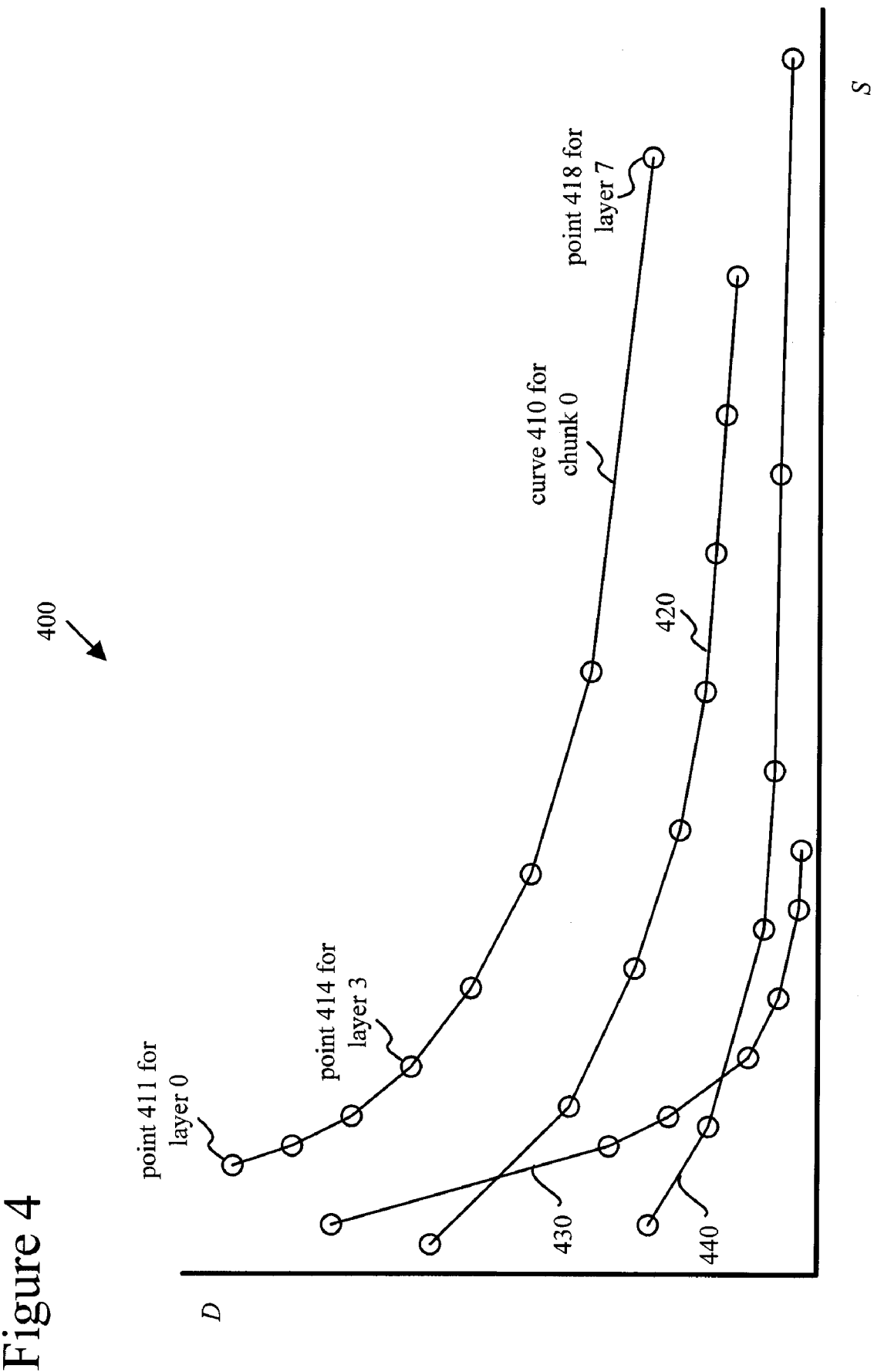
FIG. 4 is a chart illustrating distortion-download time curves for different chunks of scalable media.

FIG. 4 shows a graph (400) of distortion-download time curves (410, 420, 430, 440) for different chunks of scalable media. The respective curves are piece-wise linear and convex. Each of the curves is parameterized by multiple points, with each point defining a possible distortion and download time for chunk i. For example, the curve (410) for chunk 0 includes eight points (411 to 418) representing encoded data for different scalable layers of the chunk. The first point (411) indicates a distortion and download time when only layer 0 of the chunk is downloaded, the fourth point (414) indicates a distortion and download time when layers 0, 1, 2 and 3 of the chunk are downloaded, and so on. The different curves (410, 420, 430, 440) have different shapes due to different rate-distortion properties (e.g., different complexity) of the respective chunks. Generally, more complex chunks have higher distortion at a given rate.

When deciding which scalable layers to request, the client constrains the estimated download times of the respective chunks of the stream such that each of the respective chunks is available for decoding and playback when the time comes for that chunk to be played back. The client can buffer encoded data for at least some of the chunks before beginning playback. The initial delay $T_{-1}$ indicates startup latency as the client downloads content before playback begins. The download time $S_0$ for the first chunk should be less than or equal to the initial delay, so that encoded data for the first chunk is available when playback begins: $S_0 \leq T_{-1}$. For example, if the initial delay is 5 seconds, the download time for the first chunk should be less than 5 seconds. The download times $S_0+S_1$ for the first two chunks should be less than or equal to the initial delay plus the playback duration of the first chunk: $S_0+S_1 \leq T_{-1}+T_0$. That is, the encoded data for the second chunk should be available for decoding when the client is ready to play back the second chunk. Similarly, the playback time constraint for third chunk is:

$$S_0+S_1+S_2 \leq T_{-1}+T_0+T_1.$$

The cumulative values of the durations of chunks indicate a "timestamp" of the following chunk in the stream. Timestamp information is often signaled in a bit stream. For example, $$\sum_{j=0}^{i-1} T_j$$

indicates the timestamp of the $i^{th}$ chunk (not counting initial delay), and the timestamp value can be stored in a packet header for the $i^{th}$ chunk. For the respective chunks, playback time constraints can be modeled as:

$$CumulativeS_i = \sum_{j=0}^{i} S_j \leq \sum_{j=-1}^{i-1} T_j = CumulativeT_i,$$

where $T_{-1}$ indicates the initial delay, and where the client checks the constraint for each chunk i=0, 1, ..., M−1. CumulativeT$_i$ thus indicates the timestamp plus the initial delay for chunk i.

For the $i^{th}$ chunk of encoded media content, a client gets information $D_i[R_i]$ that indicates different levels of distortion for different rates, and the client also has information (considering network connection characteristics) that indicates estimated download time as a function of the rate for the $i^{th}$ chunk: $S_i=f_i[R_i]$. In addition, the client gets information $T_i$ that indicates a playback duration of the $i^{th}$ chunk. From this information, the client determines distortion as a function of download time for the $i^{th}$ chunk: $D_{si}[S_i]=D_{si}[f_i[R_i]]$. Alternatively, the client directly receives information that indicates distortion as a function of download time.

Subject to playback time constraints, the client finds a set of estimated download times $S_i$ that minimizes total distortion $D_{total}$.

$$D_{total} = \sum_{i=0}^{M-1} D_{si}[S_i] = \sum_{i=0}^{M-1} D_{si}[f_i[R_i]].$$

The client can model the problem of finding a set of download times using Lagrange multipliers.

$$J = \sum_{i=0}^{M-1} (D_{si}[S_i] + \lambda S_i).$$

Taking the partial derivate with respect to the estimated download time, and setting the result to zero to find an inflection point, yields $$\frac{\partial J}{\partial S_i} = \frac{\partial D_{si}}{\partial S_i} + \lambda = 0.$$

Suppose $$\frac{\partial D_{si}}{\partial S_i} = d_{si}[S_i],$$

a mapping of download time to the derivative. By substitution, it follows that the optimal rate allocation is $d_{si}[S_i]=-\lambda$. After applying an inverse function $d_{si}^{-1}[\ ]$ that maps the derivative to download time, then $S_i=d_{si}^{-1}[-\lambda]$. Generally, to find a set of download times $S_i$ for the M chunks (for i=0, ..., M−1) while also meeting the overall playback time constraint as of the last of the M chunks, the client finds a value for the weight parameter λ such that:

$$\sum_{i=0}^{M-1} d_{si}^{-1}[-\lambda] = CumulativeT_{M-1}.$$

In other words, for the entire segment of the M chunks, the client computes an allocation of download times to meet the constraint CumulativeS$_{M-1}$=CumulativeT$_{M-1}$. If the playback time constraint is violated for any of the M chunks, the client splits the chunks into different sub-segments and repeats the process for the respective sub-segments. After finding an acceptable set of download times, the client finds rate allocations from the download times. For the $i^{th}$ chunk, the rate $R_i=f_i^{-1}[S_i]$. The client can then use $R_i$ to request a version of the chunk.

For example, when the client iteratively allocates download times for a segment, or for a sub-segment within the segment, the client uses variables start and end to track start and end chunks, respectively. To find a set of download times subject to the constraint $\text{Cumulative}S_{end}-\text{Cumulative}S_{start-1} \leq \text{Cumulative}T_{end}-\text{Cumulative}T_{start-1}$, the client searches for a value of $\lambda$ such that:

$$\sum_{j=start}^{end} d_{si}^{-1}[-\lambda] = \text{Cumulative}T_{end} - \text{Cumulative}T_{start-1}.$$

The client then sets the download time allocation $S_i$ for each chunk within the segment to $S_i = d_{si}^{-1}[-\lambda]$, for i=start, ..., end.

Initially, start=0 and end=M−1. The client finds download times that satisfy the constraint $\text{Cumulative}S_{M-1} \leq \text{Cumulative}T_{M-1}$, then checks for all other values of i from start to end whether the constraint $\text{Cumulative}S_i \leq \text{Cumulative}T_i$ is met. If so, the client uses the set of download times. Otherwise, the client finds the index k of the first chunk that violates the playback time constraint. k=min (i|$\text{Cumulative}S_i > \text{Cumulative}T_i$). The client then computes download times for a segment of chunks start, ..., k and for a segment of chunks k+1, ..., end, respectively. For the segment of chunks start, ..., k, the client computes download times to meet the constraint: $\text{Cumulative}S_k - \text{Cumulative}S_{start-1} = \text{Cumulative}T_k - \text{Cumulative}T_{start-1}$. (Since download times are reduced across each of chunks start, ..., k, the playback time constraints for chunks start, ..., k−1 are still satisfied.) For the segment of chunks k+1, ..., end, the client computes download times to meet the constraint: $\text{Cumulative}S_{end-1} - \text{Cumulative}S_k = \text{Cumulative}T_{end-1} - \text{Cumulative}T_k$. If appropriate, the client further splits the segment of chunks k+1, ..., end until the playback time constraints are satisfied for the chunks. Because the value of k increases as the playback time constraints are met in a segment (i.e., the index of the first chunk (if any) that violates its playback time constraint keeps increasing), eventually download times are found for all chunks.

For example, Table 1 shows playback durations $T_i$ for ten chunks i=0, ..., 9 as well as cumulative playback duration values (shown as $C\_T_i$) for the ten chunks. The initial delay $T_{-1}=5$, and the cumulative playback duration $C\_T_9$ (including the initial delay) when the last chunk begins is 17 seconds. The first column of $S_i$ values shows download times when the playback time constraint for the entire segment of ten chunks is checked, and the first column of $C\_S_i$ values shows cumulative download times.

TABLE 1

Example download times and playback durations.

| i | $T_i$ | $C\_T_i$ | $S_i$ | $C\_S_i$ | OK? | $S_i$ | $C\_S_i$ | OK? | $S_i$ | $C\_S_i$ | OK? |
|---|---|---|---|---|---|---|---|---|---|---|---|
| −1 | 5 | 0 |  | 0 |  |  | 0 |  |  |  |  |
| 0 | 1 | 5 | 1.5 | 1.5 | yes | 1.4 | 1.4 | yes |  |  |  |
| 1 | 2 | 6 | 3.3 | 4.8 | yes | 3.1 | 4.5 | yes |  |  |  |
| 2 | 1 | 8 | 0.9 | 5.7 | yes | 0.8 | 5.3 | yes |  |  |  |
| 3 | 1 | 9 | 1.4 | 7.1 | yes | 1.2 | 6.5 | yes |  |  |  |
| 4 | 1 | 10 | 1.3 | 8.4 | yes | 1.2 | 7.7 | yes |  |  |  |
| 5 | 3 | 11 | 3.5 | 11.9 | no | 3.3 | 11 | yes |  |  |  |
| 6 | 1 | 14 | 1.2 | 13.1 |  |  |  |  | 1.4 | 12.4 | yes |
| 7 | 1 | 15 | 0.5 | 13.6 |  |  |  |  | 0.7 | 13.1 | yes |
| 8 | 1 | 16 | 0.8 | 14.4 |  |  |  |  | 1.0 | 14.1 | yes |
| 9 | 4 | 17 | 2.6 | 17.0 | yes |  |  |  | 2.9 | 17.0 | yes |

For this set of $S_i$ values, the playback time constraint is violated when i=5, at which point the cumulative playback duration $C\_T_5$ (when the chunk for which i=5 begins playback) is 11 seconds but cumulative download time $C\_S_5$ for the encoded data for chunks i=0, ..., 5 is 11.9 seconds. The client therefore splits the segment into a first sub-segment with chunks i=0, ..., 5, and a second sub-segment with chunks i=6, ..., 9. For the first sub-segment, the client finds revised download times subject to the constraint $C\_S_5 - C\_S_{-1} \leq C\_T_5 - C\_T_{-1}$. For the second sub-segment, the client finds revised download times subject to the constraint $C\_S_9 - C\_S_5 \leq C\_T_9 - C\_T_5$.

Alternatively, the client uses another approach to determine how many bits to use for chunks of media content.

V. GENERALIZED TECHNIQUE FOR SERVING MEDIA FOR FINE-GRAINED CLIENT-SIDE CONTROL

FIG. 5 shows a generalized technique (500) for serving multiple chunks of media data with fine-grained client-side control of how the media is delivered. A server such as the media server (210) of FIG. 2, Web server (220) of FIG. 2, or other server performs the technique (500).

Each of the multiple chunks is encoded as multiple scalable layers for different quality levels. Generally, the multiple chunks are organized such that an arbitrary set of layers can be selected for any chunk during playback. For example, each of the multiple chunks is encoded without dependencies on any other chunk. Or, each of the multiple chunks is encoded with, at most, dependencies on the base layer of another chunk. In some implementations, the media is encoded as bit planes in an embedded bit stream. More generally, a chunk of media is encoded as a base layer and multiple residual layers that can be combined with the base layer along a single dimension of scalability or multiple dimensions of scalability, where the number of residual layers that is used sets a rate-distortion point for the chunk.

The server stores curve information for the multiple chunks. For example, the server stores information that indicates multiple rate-distortion points for a chunk. Alternatively, the server stores shape parameters that indicate the overall shape of a rate-distortion curve for the chunk. Generally, the server can determine curve information off-line for previously encoded media, and store the curve information and encoded media for delivery to clients. Or, the server can determine the curve information as media is encoded, then store the curve information (at least temporarily) for delivery along with the encoded media data.

With reference to FIG. 5, the server sends (510) curve information for multiple chunks of media data. The server can send the curve information to a single client or to multiple clients. A client uses the curve information to determine rate-distortion preferences for media encoded as scalable layers. For example, the client uses the curve information to determine distortion-download time characteristics for the chunks, and then uses the distortion-download time characteristics to determine rate-distortion preferences for the multiple chunks. Alternatively, instead of sending curve information that indicates rate-distortion values, the server sends curve information indicating distortion-download time characteristics.

For each of the multiple chunks, the server receives (520) feedback from a client that indicates a rate-distortion preference. For example, the server receives a request for a number or range of bits for the chunk. Alternatively, the rate-distortion preference is parameterized in some other way. Using the rate-distortion preference for the chunk, the server selects (530) one or more scalable layers for the chunk and sends (540) the selected scalable layer(s) to the client. For example, the server selects a set of scalable layers for the chunk that collectively provide a rate as close as possible to the rate-distortion preference without exceeding it. The server then checks (550) whether to continue with a chunk for the same client or another client.

Although FIG. 5 shows operations such as "send curve information" and "select scalable layer(s)" that relate to scalable media delivery, in example implementations a Web server performs such operations as file retrieval and file manipulation operations in response to requests from media clients. Alternatively, a media server specially adapted to interact with media clients for fine-grained client-side control of media delivery performs the operations.

VI. GENERALIZED TECHNIQUE FOR FINE-GRAINED CLIENT-SIDE CONTROL OF MEDIA DELIVERY

FIG. 6 shows a generalized technique (600) for fine-grained client-side control of how multiple chunks of media are delivered. Generally, the multiple chunks are organized and encoded as multiple scalable layers as described with reference to FIG. 5. A client such as the media client (250) of FIG. 2 or other client performs the technique (600).

The client receives (610) curve information for multiple chunks. The curve information can include multiple rate-distortion points for a chunk. Alternatively, the curve information includes shape parameters that indicate the overall shape of a rate-distortion curve for the chunk or, instead of indicating rate-distortion values, indicates distortion-download time characteristics of the multiple chunks.

Figure 7:
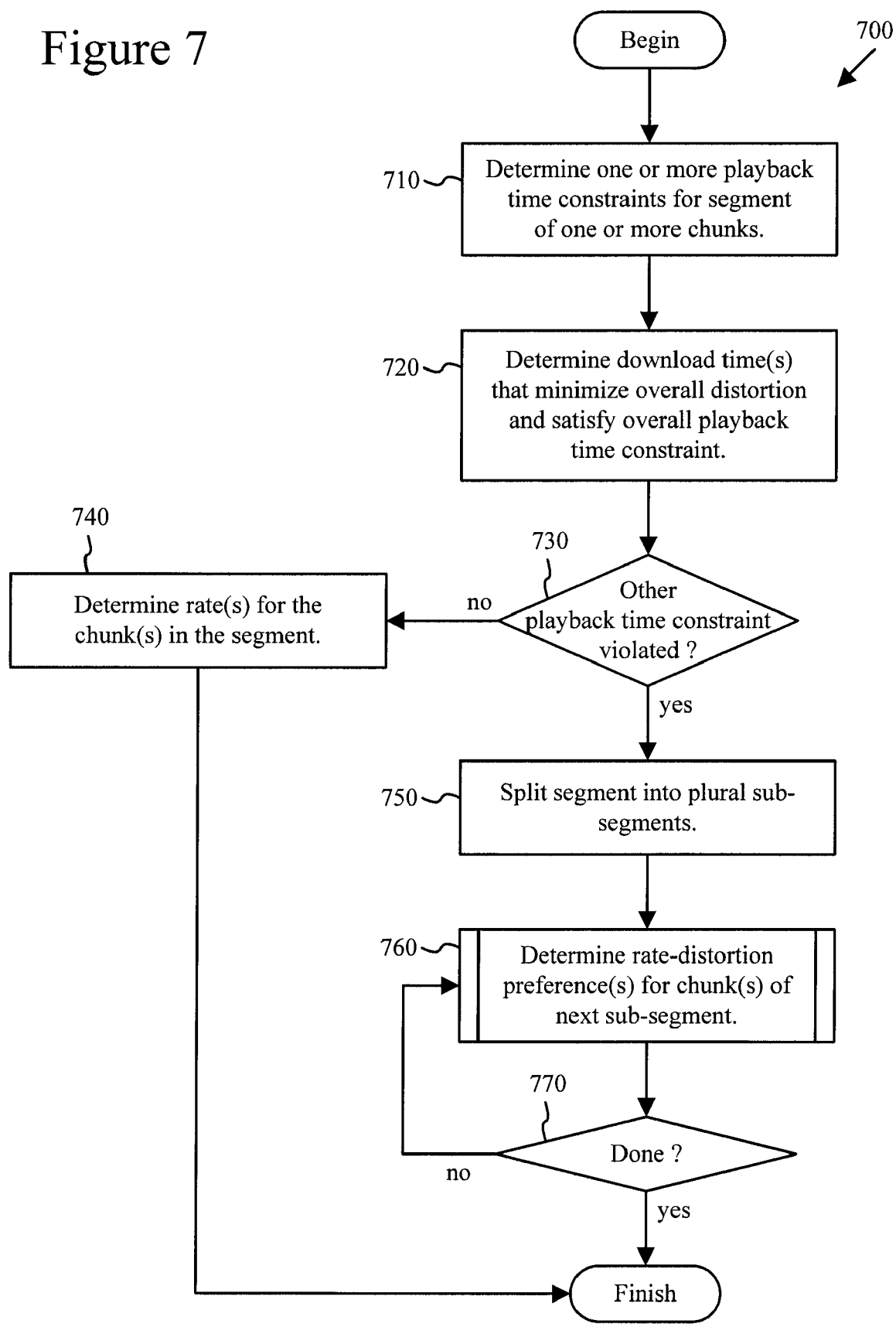
FIG. 7 is a flow chart illustrating an example technique for determining rate-distortion preferences for chunks of media.

For each of the multiple chunks, the client determines (620) a rate-distortion preference for the chunk using at least some of the received curve information. For example, the client determines a number or range of bits for each of the multiple chunks by (a) finding a set of download times that satisfies playback time constraints for the multiple chunks as explained in Section IV.B, and then (b) setting rates for the multiple chunks using the download times. FIG. 7 shows an example technique (700) for determining rate-distortion preferences in this way. Alternatively, the client uses another approach to determine rate-distortion preferences for the chunks. The client sends (630) the rate-distortion preference for the chunk to the server, which selects one or more scalable layers based at least in part upon the rate-distortion preference. The client then receives (640) one or more scalable layers for the chunk for decoding and playback. The client then checks (650) whether to continue with another chunk.

FIG. 7 shows an example technique (700) for determining rate-distortion preferences for chunks of a segment. A client such as the media client (250) of FIG. 2 or other client performs the technique (700). Generally, the technique (700) shows one approach to distortion-download time optimization as described in section IV.B.

The client determines (710) one or more playback time constraints for a segment of one or more chunks. For example, the client receives playback duration information for the one or more chunks and uses the playback duration information and an initial playback delay value to set a cumulative playback time duration for each of the one or more chunks.

The client then determines (720) one or more download times that minimize overall distortion for the one or more chunks, respectively, while also satisfying the overall playback time constraint for the segment. For example, for each of the one or more chunks, the client uses curve information to determine distortion as a function of download time for the different scalable layers of the chunk. The client then uses the distortion-download time information to select a download time for each of the one or more chunks so that the download time(s), when considered cumulatively, meet the overall playback time constraint for the segment. In selecting download times, the client can set a weight parameter such that cumulative download time for chunks in a segment matches the overall playback time constraint for the segment, and the selected download times for the chunks have the same slope on distortion-download time curves for the respective chunks.

The client checks (730) whether any intermediate playback time constraints are violated for the one or more chunks in the segment, according to the set of download times the client determined (720) considering the overall playback time constraint. If not, the client determines (740) a rate for each of the one or more chunks in the segment using the download time for the chunk, and the technique ends.

Otherwise, if an intermediate playback time constraint is violated, the client splits (750) the segment into multiple sub-segments and recursively determines (760) rate-distortion preferences for the respective sub-segments. For example, the client sets a first sub-segment to begin at the first chunk of the segment and end at the chunk where the intermediate playback time constraint is first violated, and then repeats the technique (700) for the first sub-segment. (Determining rate-distortion preferences for chunks in the first sub-segment should not require further splitting of the first sub-segment, since rates are reduced for each of the chunks of the first sub-segment and intermediate playback time constraints are still satisfied.) The client repeats the technique (700) for a second sub-segment that includes the rest of the chunks in the segment. (Determining rate-distortion preferences for chunks in the second sub-segment may require further splitting of the second sub-segment.) The client checks (770) whether to repeat the technique (700) for any more sub-segments and, if not, the technique ends.

Having described and illustrated the principles of my invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. A method of facilitating client-side control of delivery of media data organized as plural chunks to a media client across a network, a given chunk of the plural chunks being encoded as plural scalable layers for different quality levels with fine-grained scalability, the method comprising:

with a computing system that implements a media server, sending, for receipt by the media client across the network, curve information, wherein the curve information at least in part indicates distortion as a function of download time for the given chunk to facilitate determination of a rate-distortion preference for the given chunk, by the media client, that includes:

determining a playback time constraint for a segment of one or more chunks of the plural chunks, the segment including the given chunk; and for each of the one or more chunks in the segment, selecting a download time so as to reduce overall distortion among the one or more chunks in the segment while satisfying the playback time constraint for the segment; and for the given chunk of the plural chunks:
receiving feedback from the media client that indicates the rate-distortion preference for the given chunk;
with the computing system that implements the media server, based at least in part upon the rate-distortion preference, selecting one or more scalable layers from among the plural scalable layers of the given chunk; and
sending the selected one or more scalable layers of the given chunk.

2. The method of claim 1 wherein each of the plural chunks is encoded without dependencies on any other chunk of the plural chunks, and wherein the method further comprises sending, for receipt by the media client across the network, a stream header for the media data organized as plural chunks.

3. The method of claim 1 wherein, for the given chunk of the plural chunks:
the plural scalable layers include a base layer and plural residual layers;
the base layer is always selected and sent for the given chunk; and
zero or more of the plural residual layers are selected and sent for the given chunk, depending on the rate-distortion preference.

4. The method of claim 1 wherein, for the given chunk of the plural chunks, the plural scalable layers include one or more residual embedded layers resulting from bit plane encoding of the given chunk, each of the one or more residual embedded layers representing a bit plane of transform coefficients of the given chunk.

5. The method of claim 1 wherein, for the given chunk of the plural chunks, the curve information includes rate-distortion points that parameterize a rate-distortion curve for the given chunk.

6. The method of claim 5 wherein, for each of the plural scalable layers of the given chunk, the curve information includes rate information that indicates a bit count for the scalable layer.

7. The method of claim 1 wherein, for the given chunk of the plural chunks, a set of parameters in the curve information for the chunk indicates overall shape of a rate-distortion curve for the given chunk.

8. The method of claim 1 further comprising, for the given chunk of the plural chunks:
with a scalable media encoder, encoding the given chunk as the plural scalable layers;
determining the curve information for the given chunk; and
storing the plural scalable layers of the given chunk and the curve information for the given chunk in storage for delivery to plural media clients.

9. The method of claim 1 wherein the network is the Internet, and wherein the curve information, the feedback from the media client, and the selected scalable layers are delivered over the Internet.

10. The method of claim 1 wherein the computing system than implements the media server is a distributed computing system that also includes a scalable media encoder.

11. A method of controlling delivery of media data by a media server across a network, wherein the media data is organized as plural chunks, a given chunk of the plural chunks being encoded as plural scalable layers for different quality levels with fine-grained scalability, the method comprising:

at a computing system that implements a media client, receiving curve information, wherein the curve information at least in part indicates distortion as a function of download time for the given chunk; and with the computing system that implements the media client, determining a rate-distortion preference for the given chunk using at least some of the received curve information, wherein the determining the rate-distortion preference includes, for a segment of one or more chunks of the plural chunks, the segment including the given chunk:
determining a playback time constraint for the segment; and
for each of the one or more chunks in the segment, selecting a download time so as to reduce overall distortion among the one or more chunks in the segment while satisfying the playback time constraint for the segment; and
with the computing system that implements the media client, sending, for receipt by the media server across the network, the rate-distortion preference for the given chunk; and
receiving one or more scalable layers from among the plural scalable layers of the given chunk.

12. The method of claim 11 wherein the playback time constraint for the segment indicates a cumulative time duration, and wherein the selecting a download time for each of the one or more chunks in the segment comprises:
setting a weight parameter such that cumulative download time for the segment matches the cumulative time duration, wherein for each of the one or more chunks in the segment the weight parameter indicates the download time for the chunk according to the curve information for the chunk.

13. The method of claim 11 wherein the selecting a download time for each of the one or more chunks in the segment comprises:
splitting the segment into plural sub-segments; and
for each of the plural sub-segments, recursively:
determining a playback time constraint for the sub-segment; and
for each of one or more chunks in the sub-segment, selecting a download time so as to reduce overall distortion among the one or more chunks in the sub-segment while satisfying the playback time constraint for the sub-segment.

14. The method of claim 11 wherein for the given chunk of the plural chunks:
the plural scalable layers include a base layer and one or more residual layers;
the base layer is always received for the given chunk; and
zero or more of the one or more residual layers are received for the given chunk, depending on the rate-distortion preference.

15. The method of claim 11 wherein each of the plural chunks is encoded without dependencies on any other chunk of the plural chucks, and wherein the method further comprises, at the computing system that implements the media client, receiving a stream header for the media data organized as the plural chunks, the stream header including program description information for the media data organized as the plural chunks.

16. The method of claim 11 wherein the determining the rate-distortion preference for the given chunk includes determining a count of bits or range of bits for the given chunk, and wherein the sending the rate-distortion preference for the given chunk includes sending a request for the count of bits or range of bits for the given chunk.

17. The method of claim 11 wherein the method further comprises, for the given chunk of the plural chunks:
   with a scalable media decoder, decoding the received one or more scalable layers for the given chunk; and
   reconstructing a version of the given chunk from the decoded one or more scalable layers.

18. The method of claim 11 wherein the network is the Internet, and wherein the curve information, the rate-distortion preferences, and the selected scalable layers are delivered over the Internet.

19. The method of claim 11 wherein the computing system than implements the media client is a distributed computing system that also includes a scalable media decoder.

20. A computing system that implements a media client for controlling delivery of media data by a media server across a network, the system comprising:
   a processor;
   a controller for the media client, wherein the controller is adapted to:
      receive a stream header for media data that includes plural chunks, each of the plural chunks being encoded as plural scalable layers for different quality levels with fine-grained scalability;
      receive curve information for the plural chunks, wherein, for each of the plural chunks, the curve information for the chunk indicates distortion as a function of download time and a different rate-distortion point is associated with each of the plural scalable layers for the chunk;
      determine rate-distortion preferences for the plural chunks, respectively, using the received curve information, wherein the controller is adapted to determine the rate-distortion preferences by, for a segment of one or more chunks of the plural chunks:
         determining a playback time constraint for the segment; and
         for each of the one or more chunks in the segment, selecting a download time so as to reduce overall distortion among the one or more chunks in the segment while satisfying the playback time constraint for the segment; and
      send, for receipt by the media server across the network, the rate-distortion preferences for the plural chunks, respectively; and
      for each of the plural chunks, receive one or more scalable layers from among the plural scalable layers for the chunk; and
   a scalable media decoder adapted to decode the received scalable layers for the plural chunks.

21. The system of claim 20 wherein:
   the controller is further adapted to determine the rate-distortion preferences by
   for each of the one or more chunks in the segment, using the selected download time for the chunk to determine a count of bits or range of bits to request for the chunk.

22. The system of claim 21 wherein the playback time constraint for the segment indicates a cumulative time duration, and wherein the selecting a download time for each of the one or more chunks in the segment comprises:
   setting a weight parameter such that cumulative download time for the segment matches the cumulative time duration, wherein for each of the one or more chunks in the segment the weight parameter indicates the download time for the chunk according to the curve information for the chunk.

23. The system of claim 20 wherein for each of the plural chunks, the plural scalable layers include a base layer and one or more residual layers.

24. A computing system that implements a media client to control delivery of media data by a media server across a network, wherein the media data is organized as plural chunks, each of the plural chunks being encoded as plural scalable layers for different quality levels with fine-grained scalability, the system comprising a processor and a controller adapted to perform a method comprising:
   receiving, by the processor, curve information for the plural chunks, wherein, for each of the plural chunks, for the plural scalable layers of the chunk, the curve information at least in part indicates distortion as a function of download time; and
   for each of the plural chunks:
      determining a rate-distortion preference for the chunk using at least some of the received curve information, wherein the determining the rate-distortion preference includes, for a segment of one or more chunks of the plural chunks:
         determining a playback time constraint for the segment, wherein the playback time constraint for the segment indicates a cumulative time duration; and
         for each of the one or more chunks in the segment, selecting a download time so as to reduce overall distortion among the one or more chunks in the segment while satisfying the playback time constraint for the segment, wherein the selecting the download time for each of the one or more chunks in the segment comprises setting a weight parameter such that cumulative download time for the segment matches the cumulative time duration, and wherein for each of the one or more chunks in the segment the weight parameter indicates the download time for the chunk according to the curve information for the chunk;
      sending the rate-distortion preference for the chunk; and
      receiving one or more scalable layers from among the plural scalable layers of the chunk.

25. A computing system that implements a media client to control delivery of media data by a media server across a network, wherein the media data is organized as plural chunks, each of the plural chunks being encoded as plural scalable layers for different quality levels with fine-grained scalability, the system comprising a processor and a controller adapted to perform a method comprising:
   receiving, by the processor, curve information for the plural chunks, wherein, for each of the plural chunks, for the plural scalable layers of the chunk, the curve information at least in part indicates distortion as a function of download time; and
   for each of the plural chunks:
      determining a rate-distortion preference for the chunk using at least some of the received curve information, wherein the determining the rate-distortion preference includes, for a segment of one or more chunks of the plural chunks:
         determining a playback time constraint for the segment; and
         for each of the one or more chunks in the segment, selecting a download time so as to reduce overall distortion among the one or more chunks in the segment while satisfying the playback time constraint for the segment, wherein the selecting the download time for each of the one or more chunks in the segment comprises splitting the segment into plural sub-segments and, for each of the plural sub-segments, recursively:
  determining a playback time constraint for the sub-segment; and
  for each of one or more chunks in the sub-segment, selecting a download time so as to reduce overall distortion among the one or more chunks in the sub-segment while satisfying the playback time constraint for the sub-segment;
sending the rate-distortion preference for the chunk; and
receiving one or more scalable layers from among the plural scalable layers of the chunk.

* * * * *